United States Patent [19]
Uchida et al.

[11] Patent Number: 5,585,930
[45] Date of Patent: Dec. 17, 1996

[54] APPARATUS FOR RECORDING AND REPRODUCING A DIGITAL VIDEO SIGNAL

[75] Inventors: Hirofumi Uchida, Neyagawa; Tatsuro Juri, Osaka; Masakazu Nishino, Kashiwara, all of Japan

[73] Assignee: Matsushita Electric Inudstrial Co., Ltd., Kadoma, Japan

[21] Appl. No.: 240,066

[22] Filed: May 9, 1994

[30] Foreign Application Priority Data

May 10, 1993 [JP] Japan ................................. 5-108038
Sep. 6, 1993 [JP] Japan ................................. 5-220965

[51] Int. Cl.$^6$ ............................. H04N 5/92; H04N 9/80
[52] U.S. Cl. ................................. 386/40; 386/123
[58] Field of Search ......................... 358/335, 310, 358/342; 360/33.1, 32; 348/403, 420, 445; H04N 9/80, 5/92

[56] References Cited

U.S. PATENT DOCUMENTS

| | | | |
|---|---|---|---|
| 4,862,292 | 8/1989 | Enari et al. | |
| 5,023,710 | 6/1991 | Kondo et al. | 358/335 |
| 5,047,865 | 9/1991 | Inoue | 358/310 |
| 5,065,259 | 11/1991 | Kubota et al. | 358/310 |
| 5,237,424 | 8/1993 | Nishino et al. | 358/310 |
| 5,257,141 | 10/1993 | Matsumi et al. | 360/32 |

FOREIGN PATENT DOCUMENTS

| | | |
|---|---|---|
| 404383 | 12/1990 | European Pat. Off. |
| 417609 | 3/1991 | European Pat. Off. |
| 469861 | 2/1992 | European Pat. Off. |
| 529233 | 3/1993 | European Pat. Off. |

OTHER PUBLICATIONS

Patent Abstract of Japan, vol. 15, No. 304 (E–1096) Aug. 1991 re JP–A– 03108975.
Patent Abstract of Japan, vol. 14, No. 354 (E–958) Jul. 1990 re JP–A– 02123884.

*Primary Examiner*—Thai Q. Tran
*Assistant Examiner*—Huy Nguyen
*Attorney, Agent, or Firm*—Cushman, Darby & Cushman

[57] ABSTRACT

Data rates of a first video signal and a second video signal which are significantly different are converted to respective predetermined data rates, and both the video signals of one frame are divided into respective numbers of macro block. A ratio of the number of macro block of the first video signal to the number of macro block of the second signal is made to 1:n, where n is a natural number, and a ratio of the number of pixel in one macro block of a color difference signal of the first video signal to the number of pixel in one macro block of the color difference signal of the second video signal is made to 1:m, where m is a natural number. A ratio of the data rate of the color difference signal of the first video signal to the data rate of the color difference signal of the second video signal is made to 1:n×m and a ratio of a moving speed of a magnetic tape in the first video signal to a moving speed of the magnetic tape in the second video image is made to 1:n.

10 Claims, 25 Drawing Sheets

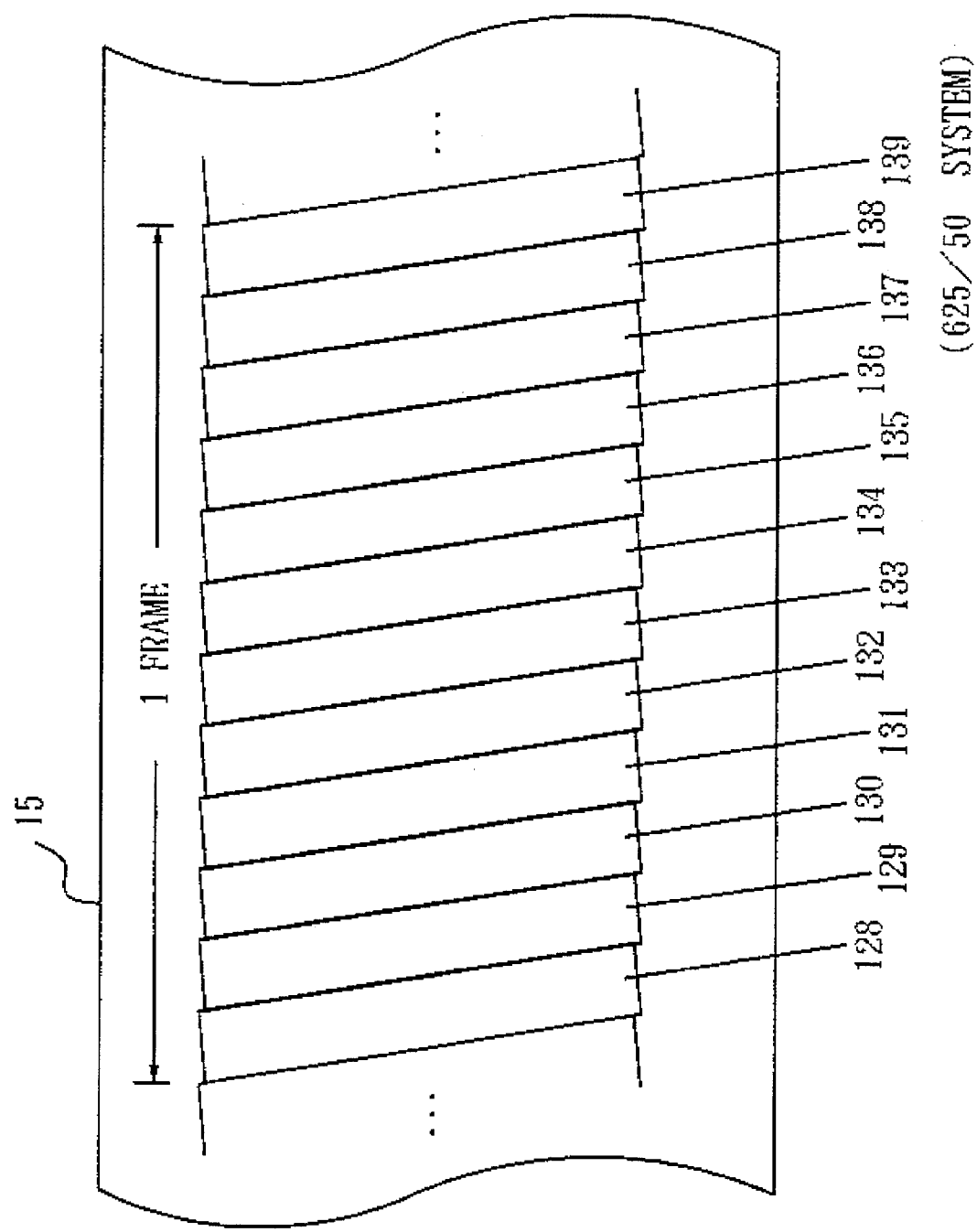

FIG. 15

| | 171 | 172 | 173 |
|---|---|---|---|
| 109 | $Y_{0,0} \cdots Y_{0,7}$ ⋮ $Y_{7,0} \cdots Y_{7,7}$ | $Y_{0,8} \cdots Y_{0,15}$ ⋮ $Y_{7,8} \cdots Y_{7,15}$ | $Y_{0,16} \cdots Y_{0,23}$ ⋮ $Y_{7,16} \cdots Y_{7,23}$ |
| | $Y_{8,0} \cdots Y_{8,7}$ ⋮ $Y_{15,0} \cdots Y_{15,7}$ | $Y_{8,8} \cdots Y_{8,15}$ ⋮ $Y_{15,8} \cdots Y_{15,15}$ | $Y_{8,16} \cdots Y_{8,23}$ ⋮ $Y_{15,16} \cdots Y_{15,23}$ |
| | 174 | 175 | 176 |

177
$r_{0,0} \cdots r_{0,7}$
⋮
$r_{7,0} \cdots r_{7,7}$

178
$b_{0,0} \cdots b_{0,7}$
⋮
$b_{7,0} \cdots b_{7,7}$ $\begin{pmatrix} 1250/50 \text{ SYSTEM} \\ 1125/60 \text{ SYSTEM} \\ 1050/60 \text{ SYSTEM} \end{pmatrix}$

FIG. 20C $A_i$ ($i = 0, 1, ..., 7, 10, 11, ..., 17$)

| 0 | 1 | 2 | 3 | 4 | 5 | 6 | 7 | 8 |
|---|---|---|---|---|---|---|---|---|

$B_i$ ($i = 0, 1, ..., 7, 10, 11, ..., 17$)

| 0 | 1 | 2 |
|---|---|---|
| 3 | 4 | 5 |
| 6 | 7 | 8 |

FIG. 20D $A_i$ ($i = 8, 9, 18, 19$)

| 0 | 1 | 2 | 3 | 4 | 5 |
|---|---|---|---|---|---|

$B_i$ ($i = 8, 9, 18, 19$)

| 0 | 1 | 2 |
|---|---|---|
| 3 | 4 | 5 |
| D | D | D |

D

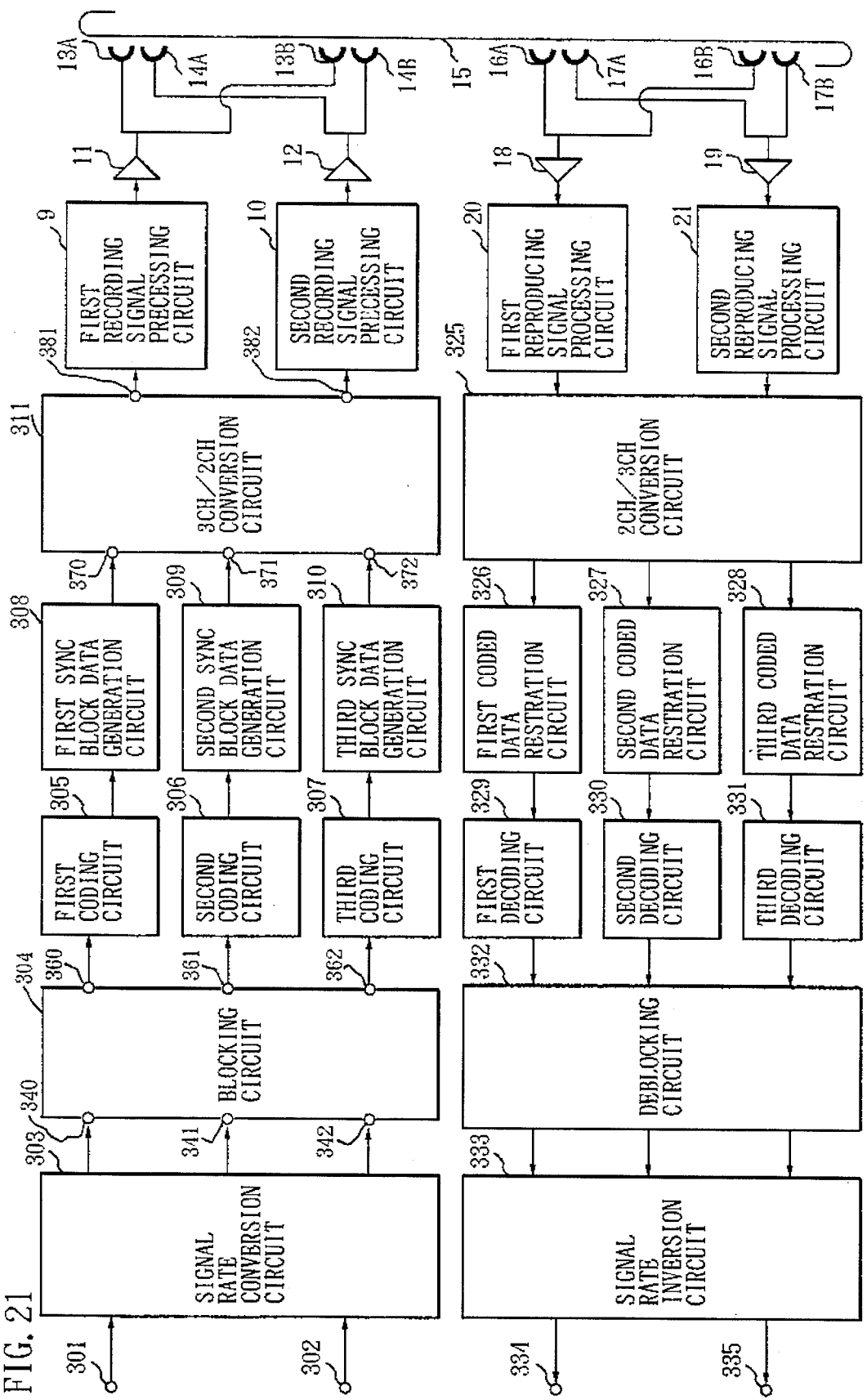

APPARATUS FOR RECORDING AND REPRODUCING A DIGITAL VIDEO SIGNAL

BACKGROUND OF THE INVENTION

1. Field Of The Invention

The present invention relates to an apparatus for recording and reproducing a digital video signal, and particularly to an apparatus for recording and reproducing digital video signals of video images of plural different video systems.

2. Description Of The Related Art

In an apparatus for recording and reproducing a digital video signal, first, one frame of a video image is divided into a plurality of image blocks. Second, the known DCT block (discrete cosine transform block) composed of 64 pixels (8 pixel×4 lines×2 fields) is defined as a unit of image. One image block comprises one DCT block representing a color difference signal (R-Y), one DCT block representing another color difference signal (B-Y) and four DCT blocks representing a luminance signal Y. Therefore, in the PAL system (hereinafter referred to as 625/50 system) for example, one frame of a video image is divided into 45 image blocks in the horizontal direction and 36 image blocks in the vertical direction. Consequently, one frame of the video image is divided into 1620 image blocks. Data of each image block divided as mentioned above is converted into coded data. A main component of the coded data of each image block is stored in one synchronizing block (hereinafter is referred to as SYNC block).

Subsequently, one frame of the video image is divided into 12 sections in the vertical direction. The SYNC block data having the coded data of the image blocks in each section are recorded on one video track of a magnetic tape. In the recording operation, the order of arrangement of the SYNC block data to be recorded on one video track is set so that the image blocks corresponding to those SYNC block data are substantially arranged at neighboring locations on an original video image. The video data of one frame divided into 12 sections are recorded in 12 video tracks.

In the NTSC system (hereinafter is referred to as 525/60 system), one frame of a video image is divided into 22.5 image blocks in the horizontal direction and 60 image blocks in the vertical direction, and consequently, one frame is divided into 1350 image blocks. The data of each image block is converted into coded data, and is stored in a corresponding SYNC block. Subsequently, one frame of the video image is divided into 10 sections in the vertical direction. A similar operation to that of the 625/50 system is applied to the data of the image blocks of each section. The SYNC block data having the coded data of the image blocks in each section are recorded in one track of the magnetic tape. Consequently, the video data of one frame is recorded on 10 video tracks.

In the above-mentioned recording methods, the signal processing method in the 625/50 system is similar to the signal processing method in the 525/60 system, and a common circuit is usable for both the systems. More-over, during high speed reproduction of the recorded data, the video images reproduced from the video data of one video track are substantially arranged at neighboring locations on the reproduced video image.

In the conventional apparatus for recording and reproducing of the digital video signal, if the number of pixel per one frame is not greatly different from each other between two separate systems, such as the 525/60 system and the 625/50 system, the same signal processing circuit is usable for both the systems. However, for example, the number of pixel per one frame in a video system is several times the number of pixel per one frame in the 625/50 system, such as the HDTV system versus 625/50 system, for example, it is difficult to use the same signal processing circuit.

OBJECT AND SUMMARY OF THE INVENTION

An object of the present invention is to provide an apparatus for recording and reproducing a digital video signal which is capable of processing video signals having a greatly different number of pixel per one frame from a common signal processing circuit.

The apparatus for recording and reproducing the digital video signal in accordance with the present invention comprises:

input means for inputting digital data of a first video signal in a first video system and a second video signal in a second video system, wherein the data of one frame of the first video signal are divided into a first predetermined number of image blocks, the data of one frame of the second video signal are divided into a second predetermined number of image blocks, data of a color difference signal of one image block of the first video signal is comprised of a third predetermined number of pixels, data of a color difference signal of one image block of the second video signal is comprised of a fourth predetermined number of pixels, a ratio of the second predetermined number to the first predetermined number is designated by "n" (natural number), and a ratio of the fourth predetermined number to the third predetermined number is designated by "m" (natural number), The apparatus further comprising:

data rate conversion means for converting a first data rate of the data of the color difference signal of the first video signal and a second data rate of the data of the color difference signal of the second video signal so that a ratio of the first data rate to the second data rate is 1:n×m, blocking means for forming image blocks so that a ratio of the first predetermined number to the second predetermined number is 1:n, and a ratio of the third predetermined number to the fourth predetermined number is 1:m, coding means for data-compressing the data of the first video signal and the second video signal so that a ratio of the data rate of the first video signal to the data rate of the second video signal is 1:n, synchronizing block data generation means for generating synchronizing block data by storing the data-compressed data of one image block of one of the first video signal and the second video signal, and recording means for recording the synchronizing block data in a recording medium.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 13 is a diagram representing video tracks in a magnetic tape on which a video signal of 625/50 system is recorded in the apparatus for recording and reproducing the digital video signal of the first embodiment;

FIG. 15 is a diagram representing the arrangement of pixels in a macro block of the video signal of 1250/50 system in the apparatus for recording and reproducing the digital video signal of the first embodiment;

FIG. 20C is a diagram representing the arrangement of macro blocks in the super blocks shown in FIG. 20A;

FIG. 20D is a diagram representing a changed arrangement of the macro blocks in the super blocks shown in FIG. 20C;

FIG. 21 is a block diagram of the apparatus for recording and reproducing the digital video signal of the second embodiment of the present invention;

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
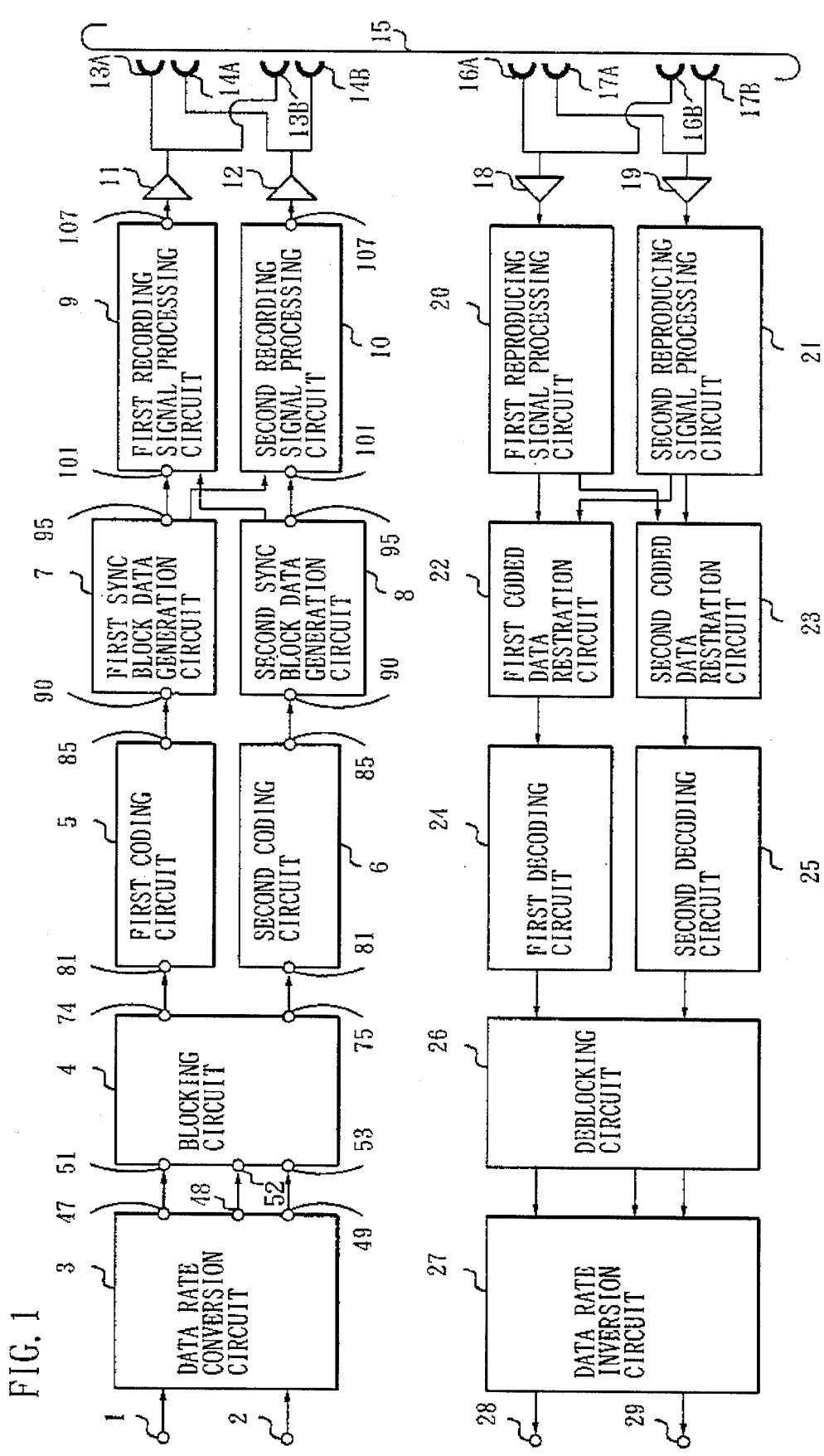
FIG. 1 is a block diagram of an apparatus for recording and reproducing a digital video signal of a first embodiment of the present invention.

FIG. 1 is a block diagram of the apparatus for recording and reproducing a digital video signal according to a first embodiment of the present invention. In the description of the first embodiment of the present invention, a first video signal is of the 625/50 system (hereinafter is referred to as PAL signal), and a second video signal is of the 1250/50 system (hereinafter is referred to as HDTV signal), for example.

In FIG. 1, first, an analog PAL signal is input to a first input terminal 1, or an analog HDTV signal is input to a second input terminal 2. Finally, the digital PAL signal or the digital HDTV signal is recorded in a magnetic tape 15, for example. Recording and reproducing heads of the magnetic tape recording apparatus comprises combination heads. The combination head comprises two head elements. In each combination head, a first recording combination head is composed of heads 13A and 14A, and a second recording combination head is composed of heads 13B and 14B. Reproducing combination heads 16A, 17A and 16B, 17B are configured in a manner similar to the recording combination heads. Therefore, signals of two channels may be simultaneously recorded on the magnetic tape 15 and reproduced therefrom. The magnetic tape 15 is wound around the known rotary cylinder (not shown) for about 180 degrees of central angle. Two recording combination heads 13A, 14A and 13B, 14B are disposed on the rotary cylinder at both opposed positions of 180 degrees of central angle. Both the combination heads are adjusted so as to helically scan the surface of the magnetic tape.

[Recording of PAL signal]

Figure 2:
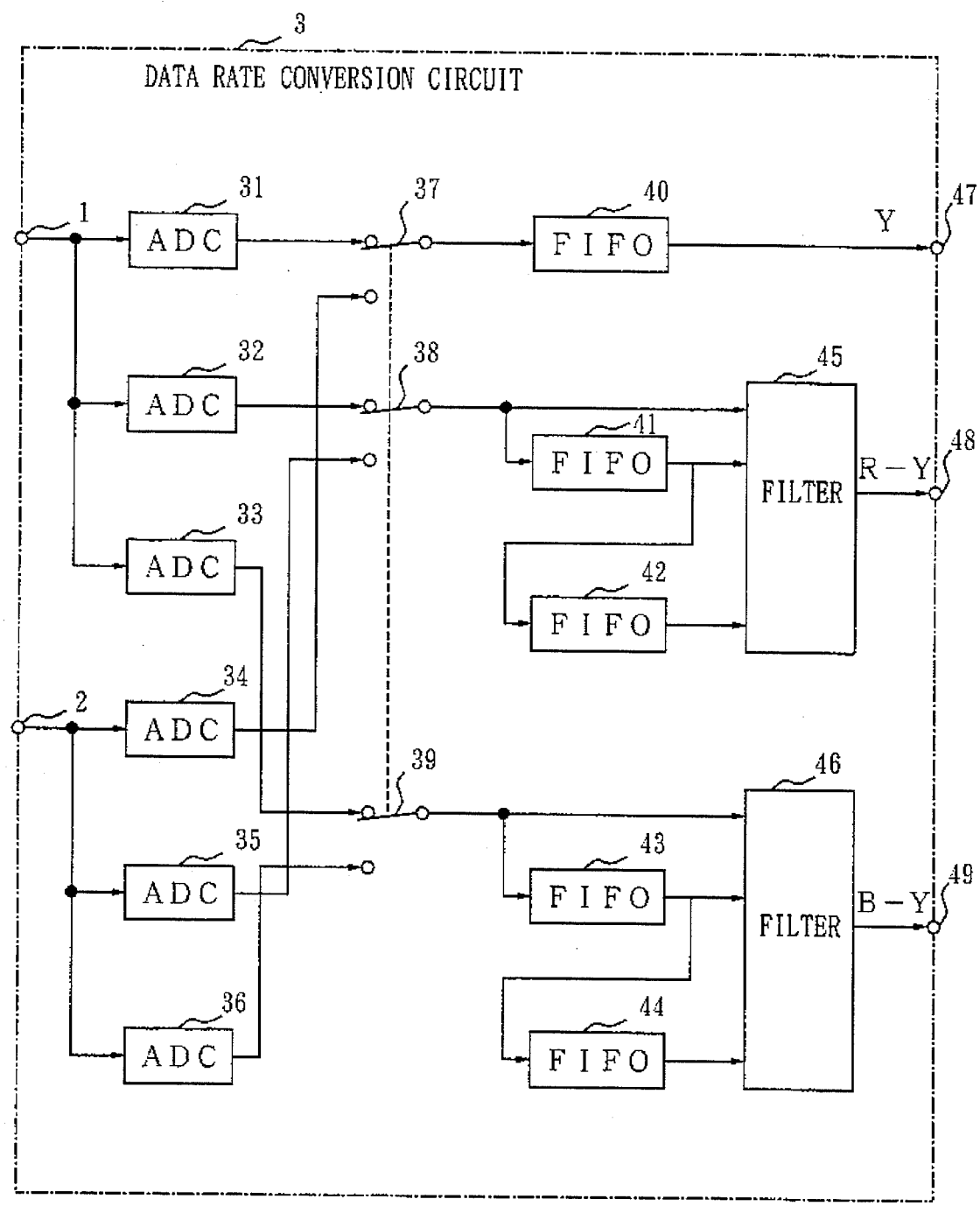
FIG. 2 is a block diagram of a data rate conversion circuit in the apparatus for recording and reproducing the digital video signal of the first embodiment.

In the first embodiment of the apparatus for recording and reproducing the digital video signal, first, the recording operation of the PAL signal is described hereafter. The analog PAL signal is input to a data rate conversion circuit 3 through the input terminal 1. A detailed configuration of the data rate conversion circuit 3 is shown in a block diagram of FIG. 2. Referring to FIG. 2, switches 37, 38 and 39 are linked for simultaneous operation and select either the first video signal input from the first input terminal 1 or the second video signal input from the second input terminal 2. In FIG. 2, the switches 37, 38 and 39 contact respective upper contacts, and analog to digital converters (hereinafter is referred to as ADC) 31, 32 and 33 are connected to a known first-in and first-out circuit (hereinafter is referred to as FIFO) 40 and filters 45 and 46, respectively.

A luminance signal Y (hereinafter is referred to as Y signal) of the first image signal input from the input terminal 1 is sampled with a clock signal of 13.5 MHz and is converted to a digital signal by the ADC 31. The digital signal is applied to the FIF0 40. On the other hand, a color difference signal (R-Y) (hereinafter is referred to as (R-Y) signal) of the first video signal is sampled with a clock signal of 6.75 MHz and is converted to a digital signal by the ADC 32. The digital signal is applied to a filter 45 and an FIFO 41 through the switch 38. Moreover, a color difference signal (B-Y) (hereinafter is referred to as (B-Y) signal) of the first video signal is sampled with the clock signal of 6.75 MHz and is converted to a digital signal by the ADC 33. The digital signal is applied to the filter 46 and an FIFO 43 through the switch 39. An FIF0 42 is connected between the output of the FIF0 41 and the filter 45, and an FIF0 44 is connected between the output of the FIF0 43 and the filter 46.

The FIFOs 40 - - - 44 serve as 1H delay memories for delaying the PAL signal by one horizontal scanning period and store it. The stored Y signal is output to a terminal 47. The (R-Y) signal and (B-Y) signal are decimated on alternate scanning lines and are output to respective terminals 48 and 49. Consequently, the PAL signal is converted into the digital data of the known 4:2:0 format.

The number of "effective pixels" of the Y signal is represented by 720 pixels in the horizontal direction and 288 scanning lines in the vertical direction per one field. The number of effective pixels of the (R-Y) signal is represented by 360 pixels in the horizontal direction and 144 scanning lines in the vertical direction per one field, and the number of effective pixels of (B-Y) signal is also represented by 360 pixels in the horizontal direction and 144 scanning lines in the vertical direction per one field.

The digital signal converted to the 4:2:0 format is input to a blocking circuit 4 according to a first embodiment of the present invention. A detailed configuration of a first example of the blocking circuit 4 is shown by the block diagram of FIG. 3. The blocking circuit 4 is composed of a first blocking circuit 76 and a second blocking circuit 77. The Y signal output from the terminal 47 of the data rate conversion circuit 3 is input to FIFOs 54, 55 and 56 through a terminal 51 of the first blocking circuit 76. Moreover, the (R-Y) signal output from the terminal 48 of the data rate conversion circuit 3 is input to an FIFO 57 through a terminal 52, and the (B-Y) signal output from the terminal 49 of the data rate conversion circuit 3 is input to an FIFO 58 through a terminal 53 of the first blocking circuit 76. The Y-signal, (R-Y) signal and (B-Y) signal are selected by a selector 59 and are input to a memory 61 of the second blocking circuit 77.

In the second blocking circuit 77, the input data are successively stored in the memory 61 on the basis of a control signal of a write address control circuit 64. Subsequently, the stored data are read out from the memory 61 on the basis of a control signal of a read address control circuit 65, and the read data are structured to an image block (hereinafter is referred to as macro block), and is applied to an FIFO 66 or an FIFO 69.

Figure 7:
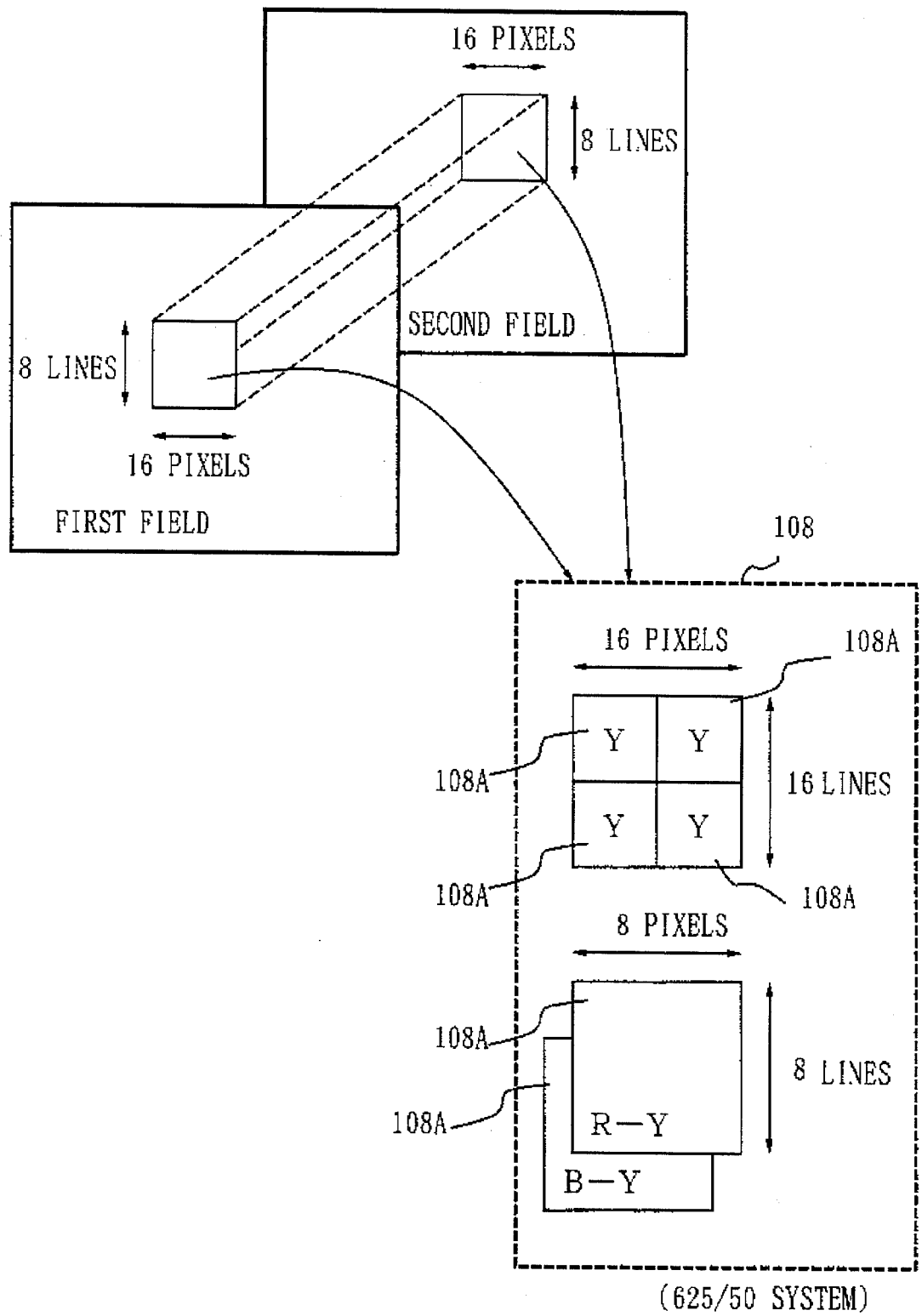
FIG. 7 is a diagram representing a macro block of one frame of the 625/50 system in the apparatus for recording and reproducing the digital video signal.

The configuration of a macro block 108 in the 625/50 system is shown in FIG. 7. In one macro block 108, the Y signal is represented by four DCT blocks 108A, 108A, 108A, 108A. Each one DCT block 108A is composed of data of two fields of the product of four pixels in the horizontal direction by four lines in the vertical direction. The (R-Y) signal and (B-Y) signal are formed by one DCT block, respectively.

Figure 9:
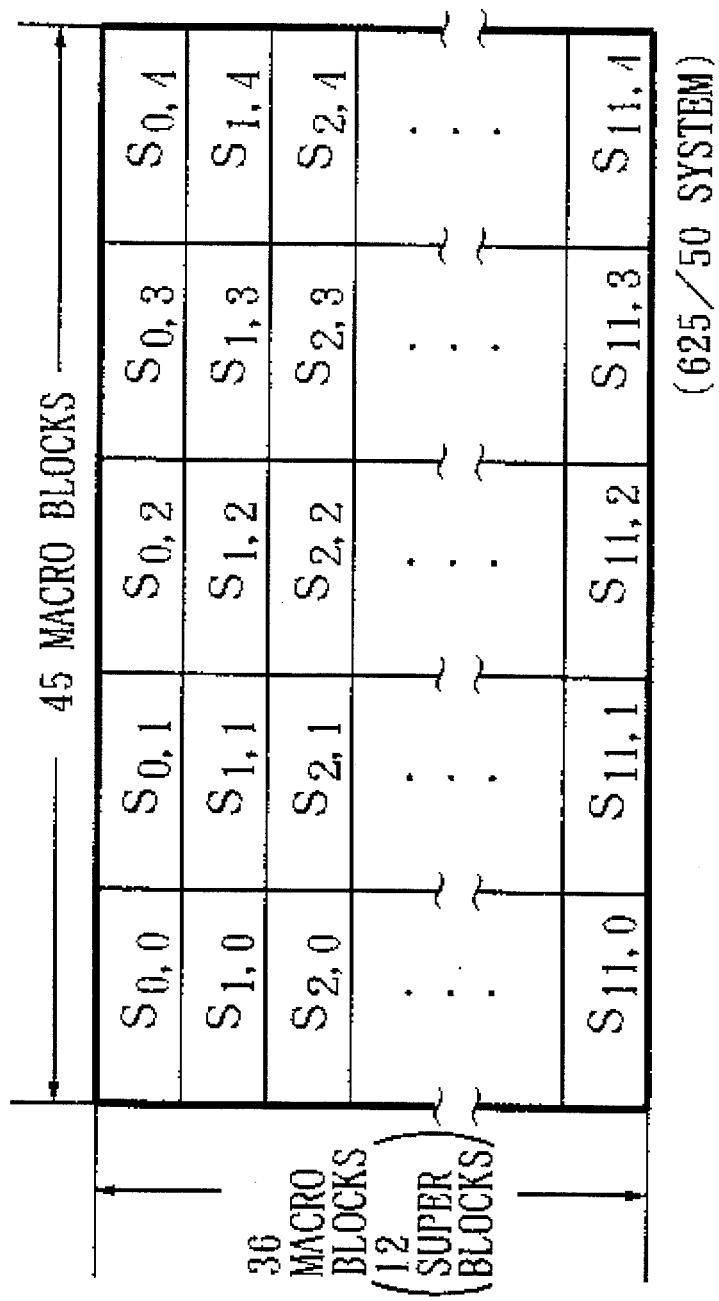
FIG. 9 is a diagram representing the arrangement of super blocks in one frame of the 625/50 system in the apparatus for recording and reproducing the digital video signal of the first embodiment.

Subsequently, the video image of one frame is divided into a plurality of "super blocks". FIG. 9 is a diagram representing the arrangement of the super blocks in one frame. Referring to FIG. 9, one frame is divided into twelve sections in the vertical direction and five sections in the horizontal direction, and finally is divided into 60 super blocks. A super block is represented by $S_{i,j}$ (i=0, ..., 11; j=0, ..., 4). Each super block $S_{i,j}$ comprises 27 macro blocks. The arrangement of 27 macro blocks in a super block is represented by $M_{i,j,k}$ (k=0, 1, ..., 26). In the example shown in FIG. 11, a first macro block $M_{i,j,0}$ is placed at the upper left, and successive macro blocks $M_{i,j,1}$ and $M_{i,j,2}$ are arranged downward in numerical order. At the bottom, the successive macro block $M_{i,j,3}$ is arranged rightward, and macro blocks $M_{i,j,4}$ and $M_{i,j,5}$ are arranged upward in numerical order. At the top, the successive macro block $M_{i,j,6}$ is placed rightward, and macro blocks $M_{i,j,7}$ and $M_{i,j,8}$ are arranged downward in numerical order. Remaining macro blocks $M_{i,j,k}$ are arranged in a manner mentioned above, and the final macro block $M_{i,j,26}$ is placed lower right in the super block.

Figure 3:
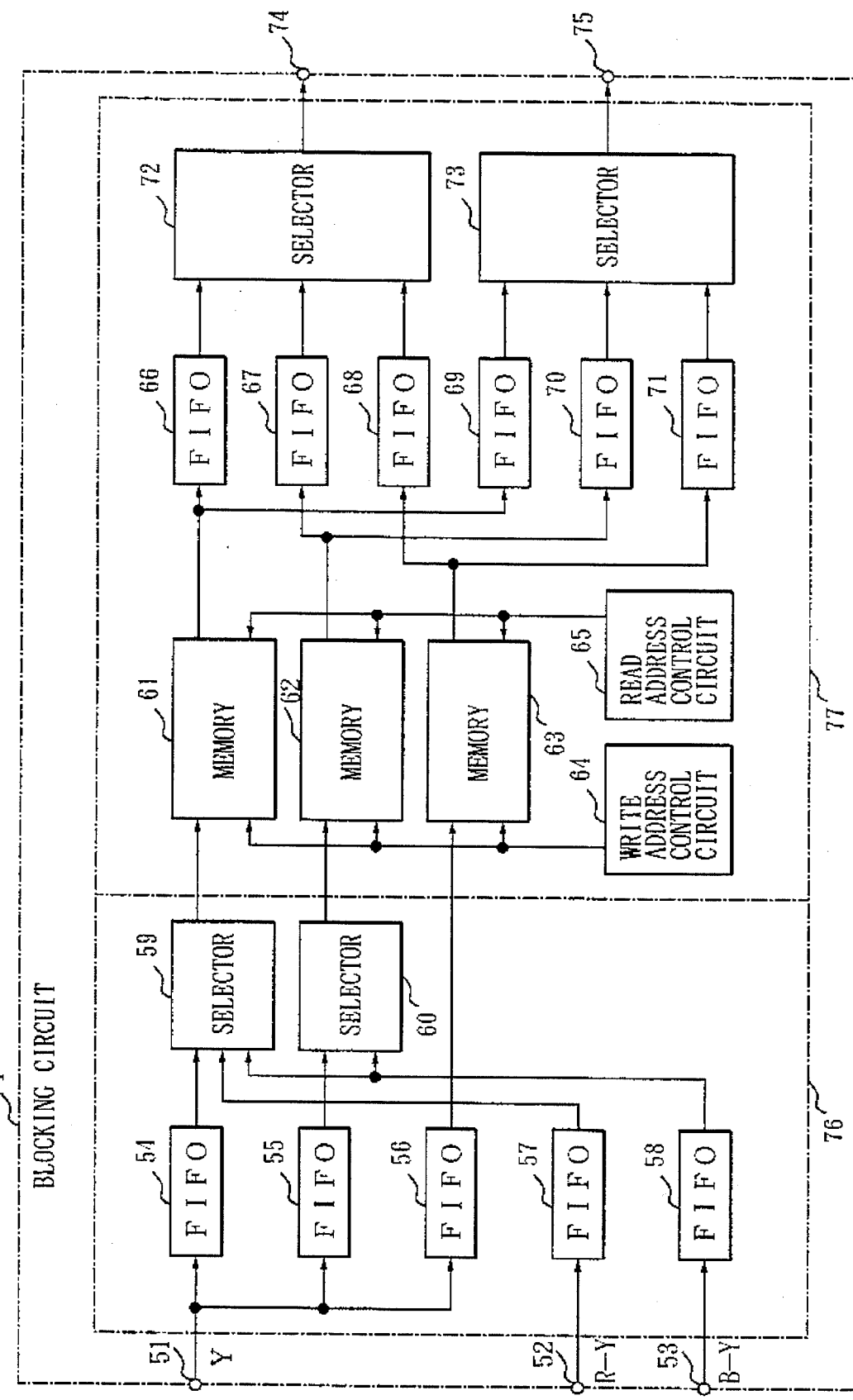
FIG. 3 is a block diagram of a first example of a blocking circuit in the apparatus for recording and reproducing the digital video signal of the first embodiment.

In the FIFO 66 shown in FIG. 3, a "video segment" is formed by plural macro blocks $M_{i,j,k}$ input from the memory 61. The video segment is described in detail hereafter. The data of the video segment is output to a terminal 74 through a selector 72.

One video segment is composed of five macro blocks. In five super blocks, which are located at separate positions in the video image, one macro block is designated with respect to each super block, and one video segment is formed by the designated five macro blocks. A video segment is represented by $V_{i,k}$, and five macro blocks $M_{i,j,k}$ represented by Equation (1) correspond to a video segment $V_{i,k}$ as follows:

$$V_{i,k} = \{ M_{(i+2) \bmod 12,\ 2,\ k},\ M_{(i+6) \bmod 12,\ 1,\ k},\ M_{(i+8) \bmod 12,\ 3,\ k},\ M_{(i+0) \bmod 12,\ 0,\ k},\ M_{(i+4) \bmod 12,\ 4,\ k} \}, \quad (1)$$

$$(i = 0, 2, 4, 6, 8, 10;\ k = 0, \ldots, 26).$$

Referring to Equation (1), a representation "(i+2) mod 12" in a term "I" of subscripts of "M" represents a "modulo operation" for deriving a remainder by dividing the value of (i+2) by 12. The values 2, 6, 8, 0 and 4 in the respective parentheses are arbitrarily selected. Numerals in a term "J" of the subscripts represent the values of "j" for designating the positions of the super blocks in the horizontal direction. These numerals are also arbitrarily selected.

The term "K" of the subscripts represents the macro block number "k". A video segment "$V_{i,k}$" is comprised of five macro blocks having the same number "k" in five super blocks selected as shown by Equation (1).

In the Equation (1), a super block $S_{i,j}$ and a macro block $M_{i,j,k}$ in the case of "i=2" and "k=1" are shown in Table 1.

TABLE 1

| Super block | Macro block |
|---|---|
| $S_{4,2}$ | $M_{4,2,1}$, |
| $S_{8,1}$ | $M_{8,1,1}$, |
| $S_{10,3}$ | $M_{10,3,1}$, |
| $S_{2,0}$ | $M_{2,0,1}$, |
| $S_{6,4}$ | $M_{6,4,1}$. |

In Table 1, addresses of the super blocks (see FIG. 9) are shown in the left column, and the order from the top to the bottom represents a "first arrangement order of super blocks". Namely, the first order of arrangement of the super blocks is designated by the Equation (1). The addresses of the macro blocks in each super block are shown in the right column (the macro blocks having the number (1) in FIG. 11.

In the term "J" of the subscripts of Equation (1), the order of the numerals "2, 1, 3, 0, 4" designates positions in the horizontal direction on the video image as shown in FIG. 9. The numeral "2" represents a central area in the video image. In a similar manner, the numerals "1" and "3" represent both areas neighboring to the central area "2", and the numerals "0" and "4" represent both end areas. As shown by Equation (1), the macro block of the central part on the video image is arranged on the top line in Equation (1), and the macro block of the end part on the video image is arranged in the bottom line in Equation (1). In the data processing of the embodiment, the macro block of the upper line in Equation (1) has priority over the macro block of the lower line, because the macro block of the upper line is located on the important central part of the video image and the macro block of the lower line is located on the end part of the video image which is relatively lower in importance. By the above-mentioned selection of the skipped numerals such as 2, 6, 8, 0 and 4, five super blocks located at separate positions may be designated in the horizontal direction and the vertical direction on the video image.

The order of the video segments $V_{i,k}$ is as follows:

$[V_{0,0}, \quad V_{0,1}, \quad V_{0,2}, \quad \ldots, \quad V_{0,26},$
$V_{2,0}, \quad V_{2,1}, \quad V_{2,2}, \quad \ldots, \quad V_{2,26},$
$\cdot \quad \cdot \quad \cdot$
$\cdot \quad \cdot \quad \cdot$
$\cdot \quad \cdot \quad \cdot$
$V_{10,0}, \quad V_{10,1}, \quad V_{10,2}, \quad \ldots, \quad V_{10,26}].$ In the above-mentioned expression of the order of the video segments, the video segments are output in the order from left to right in each horizontal line starting from the top line, and are output in the order shown by successive lower lines.

The macro blocks in the video segment are applied to the coding circuit 5 in the order shown in Equation (1) and are encoded in the order. The coded data are output to a terminal 94 of the coding circuit 4. In the coded data of each macro block of the video segment, in the case that the data of the macro block of the top line in Table 1 overflow by exceeding a predetermined data length, the overflow data are stored in a data area for the macro block of the subsequent lower line in Table 1. In a similar manner, data overflowing from the macro block of the upper line is successively stored in a data area for the macro block of the lower line. Consequently, in the case that overflow data can not be stored in the data area for the macro block of the bottom line in Table 1, the overflow data are abandoned. However, since the macro block of the bottom line has the image data of peripheral parts of the video image, even if the data of the macro block of the bottom line is abandoned, the reproduced video image is deteriorated only on the peripheral parts. Consequently, damage in the quality of the reproduced image is relatively small.

In a similar operation, other video segments are formed from macro blocks in FIFOs 69, 70 and 71 and a selector 73, and is output to a terminal 75. An order of arrangement of the macro blocks in the video segment is represented by Equation (2).

$$V_{i,k} = \{M_{(i+2) \bmod 12, 2, k}, \quad (2)$$
$$M_{(i+6) \bmod 12, 1, k},$$
$$M_{(i+8) \bmod 12, 3, k},$$
$$M_{(i+0) \bmod 12, 0, k},$$
$$M_{(i+4) \bmod 12, 4, k}\},$$

$(i = 1, 3, 5, 7, 9, 11; \quad k = 0, 1, 2, 3, \ldots, 26).$

The order of the video segments $V_{i,k}$ is as follows:

$[V_{1,0}, \quad V_{1,1}, \quad V_{1,2}, \quad \ldots, \quad V_{1,26},$
$V_{3,0}, \quad V_{3,1}, \quad V_{3,2}, \quad \ldots, \quad V_{3,26},$
$\cdot \quad \cdot \quad \cdot$
$\cdot \quad \cdot \quad \cdot$
$\cdot \quad \cdot \quad \cdot$
$V_{11,0}, \quad V_{11,1}, \quad V_{11,2}, \quad \ldots, \quad V_{11,26}].$ In the video segment $V_{i,k}$ shown in the Equation (1), since "i" is 0, 2, 4, 6, 8 or 10, the video segment is configurated from the macro blocks $M_{i,j}$ which belong to the super blocks $S_{i,j}$ having even numbers in the vertical direction of the video image. Moreover, in the segment $V_{i,k}$ shown in the Equation (2), "i" is 1, 3, 5, 7, 9 or 11, the video segment is configurated by the macro blocks $M_{i,j,k}$ which belong to the super blocks $S_{i,j}$ of lines having an odd number in the vertical direction of the video image.

The block data output from the terminal 74 is applied to a first coding circuit 5, and the block data output from the terminal 75 is applied to a second coding circuit 6.

Figure 4:
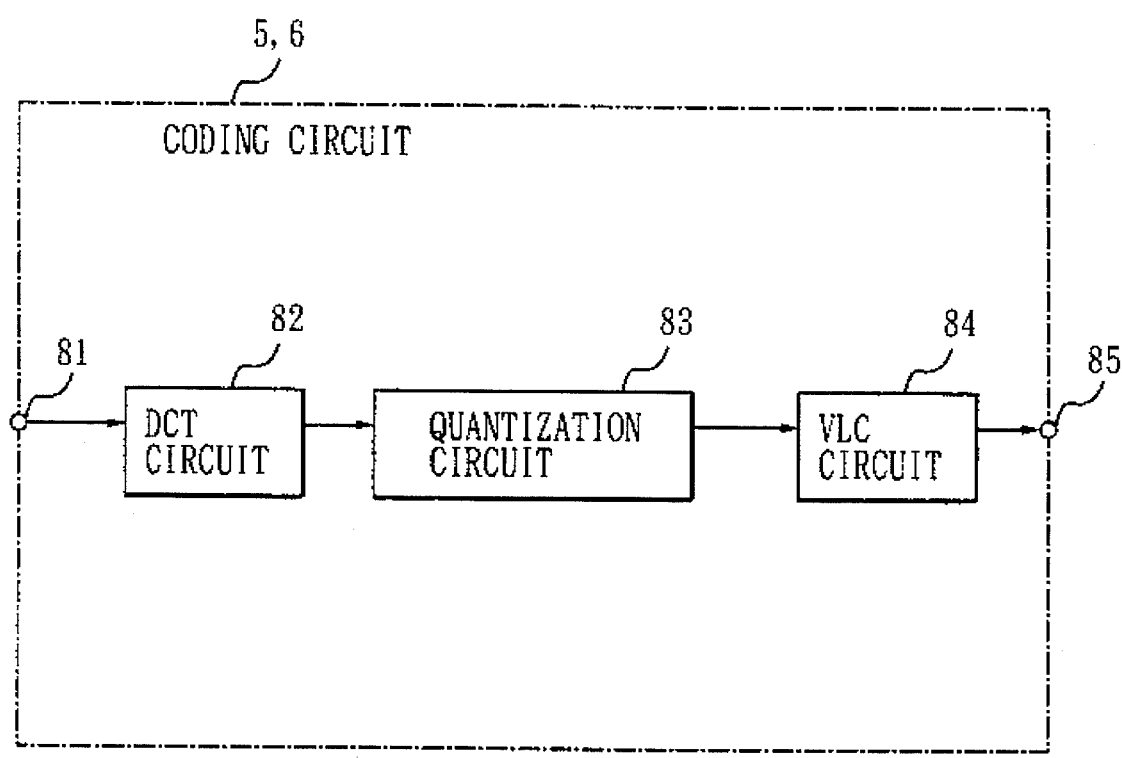
FIG. 4 is a block diagram of a coding circuit in the apparatus for recording and reproducing the digital video signal of the first embodiment.

The first coding circuit 5 and the second coding circuit 6 are configurated by known coding circuits, as shown in FIG. 4. The block data represented by Equation (1) and Equation (2) is input to respective terminals 81, and are data-compressed by a DCT circuit 82, quantization circuit 83 and a VLC circuit 84, and are output to respective terminals 85. The output of the first coding circuit 5 is applied to the known first synchronizing block data generation circuit 7 (hereinafter is referred to as first SYNC block data generation circuit), and in a similar manner, the output of the second coding circuit 6 is applied to a second SYNC block data generation circuit 8.

Figure 5:
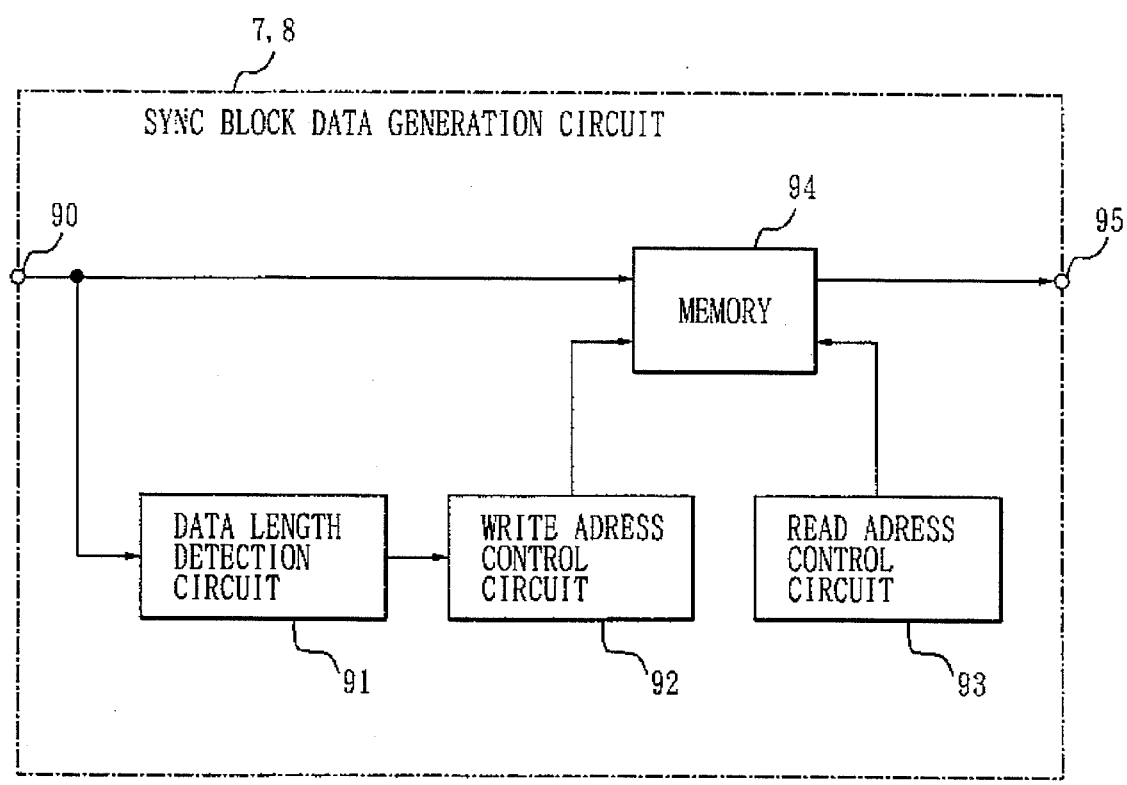
FIG. 5 is a block diagram of a SYNC block data generation circuit in the apparatus for recording and reproducing the digital video signal of the first embodiment.
Figure 12A:
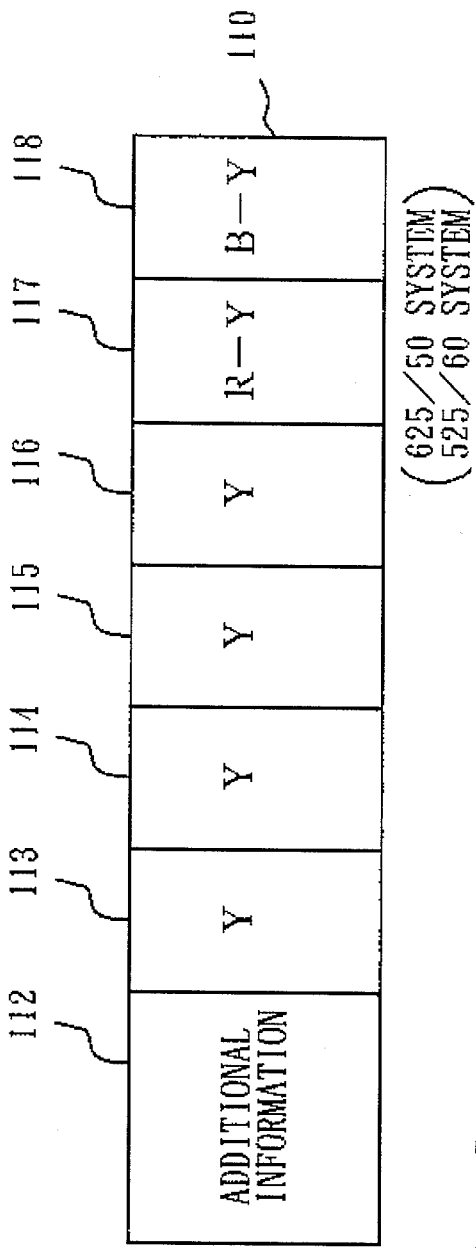
FIG. 12A is a diagram representing SYNC block data of the 625/50 system in the apparatus for recording and reproducing the digital video signal of the first embodiment.

Detailed configurations of the first SYNC block data generation circuit 7 and the second SYNC block data generation circuit 8 are shown in FIG. 5. Referring to FIG. 5, the block data input to a terminal 90 is applied to a memory 94 and a data length detection circuit 91. In the data length detection circuit 91, the length of the block data is detected, and a detected signal is applied to a write address control circuit 92. The block data input from the terminal 90 is written in a predetermined address of the memory 94 by a control signal from the write address control circuit 92. A plurality of memory areas of the SYNC block data 110, as shown in FIG. 12A, are prepared in the memory 94, and one SYNC block data 110 corresponds to one memory area. The coded data of one macro block is stored in predetermined image data areas 113 - - - 118 which are allotted to the DCT blocks of the macro block. In the storing operation, a low frequency component in the coded data of the video image is given priority. A part of the coded data which overflows from the image data area is stored in an image data area having allowance in the image data areas 113 - - - 118. Coded data which overflows the image data area is stored in other SYNC block data having allowance. Moreover, additional information is stored in an additional information area 112 of the SYNC block data 110. By the above-mentioned operation, the low frequency component of the video signal (hereinafter is referred to as a main component of the coded data) is stored in a corresponding area of one SYNC block data.

Subsequently, in FIG. 5, the coded data is read out from the memory 94 in compliance with the control signal of a read address control circuit 94 in units of one SYNC block data, and is output to a terminal 95. Referring to FIG. 1, the coded data output from the first SYNC block data generation circuit 7 and the second SYNC block data generation circuit 8 are applied to a first recording signal processing circuit 9 and a second recording signal processing circuit 10, respectively.

The SYNC block data is represented by $U_{i,j,k}$ and one SYNC block data $U_{i,j,k}$ comprises the main component of the data-compressed data of one macro block $M_{i,j,k}$.

Figure 6:
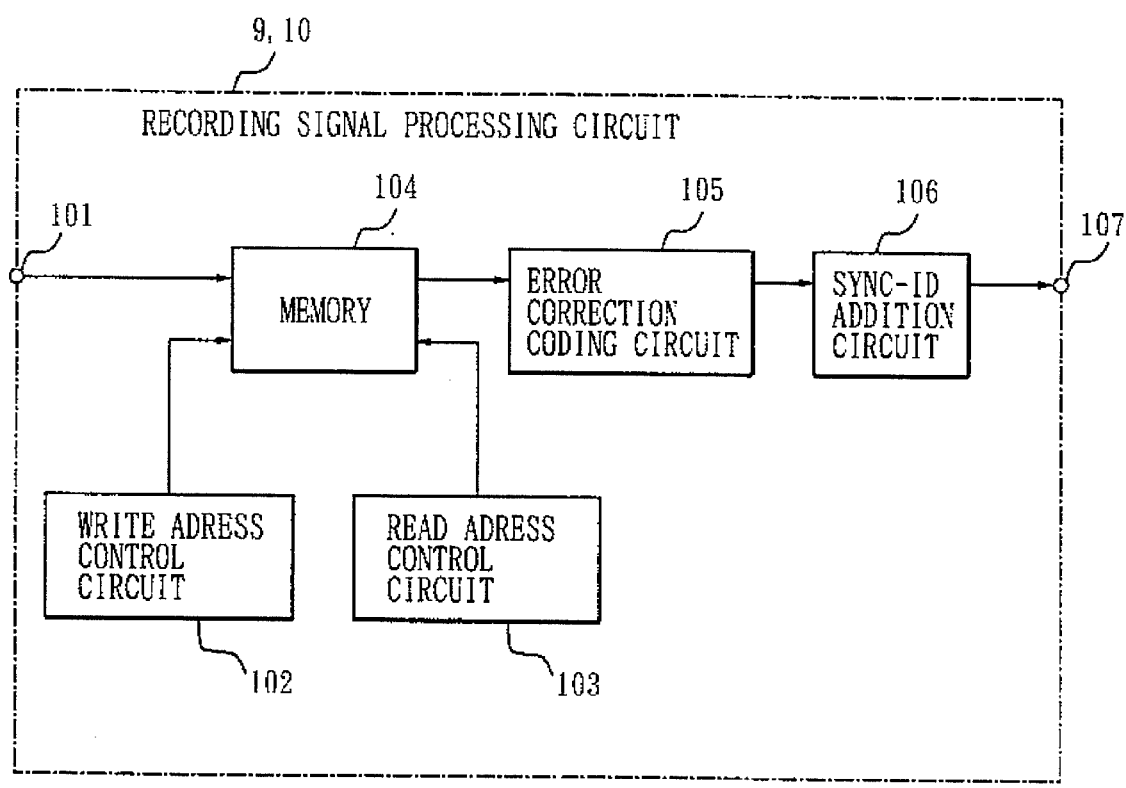
FIG. 6 is a block diagram of a recording signal processing circuit in the apparatus for recording and reproducing the digital video signal of the first embodiment.

The first recording signal processing circuit 9 and the second recording signal processing circuit 10 are configurated by the known circuit as shown in FIG. 6. Referring to FIG. 6, the SYNC block data input from a terminal 101 is written in a memory 104 by a control signal from a write address control circuit 102. Subsequently, the written SYNC block data is rearranged to a predetermined order by the control signal from a read address control circuit 103 and read out from the memory 104. The data read out of the memory 104 is applied to an error correction coding circuit 105, and the known outer coding operation or inner coding operation is applied thereto. Subsequently, predetermined SYNC pattern and predetermined ID data are added to each SYNC block data in a SYNC-ID addition circuit 106, and is output to a terminal 107.

Referring to FIG.1, the SYNC block data output from the first recording signal processing circuit 9 is applied to the recording heads 13A and 13B through a recording amplifier 11, and the SYNC block data output from the second recording signal processing circuit 10 is applied to the recording heads 14A and 14B through a recording amplifier 12. Consequently, the SYNC block data are recorded on the magnetic tape 15.

In the recording operation of the PAL signal, recording signals are output from the first and second recording signal processing circuits 9 and 10 only when the first combination heads 13A and 14A scan on the magnetic tape 15. Namely, the recording operation is performed during a half revolution period of the rotating cylinder. The moving speed of the magnetic tape 15 is predetermined so that the magnetic tape 15 is moved by a width of the recording track formed by one head, for example the head 13A, in the half rotation period of the rotating cylinder. Consequently, the recording tracks are formed on the magnetic tape 15 by the first combination heads 13A and 14A without blank.

In the recording operation on the magnetic tape 15, five super blocks $S_{0,0}, S_{0,1}, S_{0,2}, S_{0,3}$ and $S_{0,4}$ in the horizontal direction in FIG. 9 are recorded on one track. In a similar manner, five super blocks $S_{1,0}, \ldots S_{1,4}$ are recorded on the successive one track. Consequently, the super blocks $S_{i,j}$ of one frame are recorded in twelve tracks 128 - - - 139 as shown in FIG. 13. Referring to FIG. 13, the tracks 128, 130, 132, 134, 136 and 138 having even numbers are recorded by the recording head 13A, and the tracks 129, 131, 133, 135, 137 and 139 having odd numbers are recorded by the recording head 14A.

The order of the SYNC block data $U_{i,j,k}$ of data $T_i$ which are recorded from the starting point to the end point of a track having a number "i" in the twelve tracks is represented by Equation (3).

$$T_i = \{U_{i,0,0}, \ldots, U_{i,0,26}, \qquad (3)$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26}\},$$
$$(i = 0, \ldots, 11).$$

[Recording operation of a HDTV signal (1250/50) in the first embodiment]

Recording operation of the HDTV signal is described hereafter. Referring to FIG. 1, an analog HDTV signal is input to the terminal 2 and is applied to the data rate conversion circuit 3. In the detailed signal rate conversion circuit 3 in FIG. 2, the switches 37, 38 and 39 are connected to ADCs 34, 35 and 36, respectively. The Y signal of the HDTV signal is sampled with the clock signal of 40.5 MHz and is converted into a digital signal by an ADC 34. The converted digital signal is applied to the FIFO 40 through the switch 37. The (R-Y) signal of the HDTV signal is sampled with the clock signal of 13.5 MHz and is converted into a digital signal by an ADC 35. The converted digital signal is applied to the filter 45 and the FIFO 41 through the switch 38. Moreover, the (B-Y) signal of the HDTV signal is sampled with the clock signal of 13.5 MHz and is converted into a digital signal by an ADC 36. The converted digital signal is applied to the filter 46 and the FIF0 43 through the switch 39.

When the switches 37, 38 and 39 are connected to the ADCs 34, 35 and 36, respectively, the FIFOs 40, 41, 42, 43 and 44 serve as 1H delay memories of the HDTV signal, and the (R-Y) signal and (B-Y) signal are decimated every two lines. Consequently, the HDTV signal is converted into the signal of the known 12:4:0 format. The converted Y signal is output to the terminal 47, the (R-Y) signal is output to the terminal 48, and the (B-Y) signal is output to the terminal 49. Effective pixels of the Y signal per one field are represented by 1080 pixels in the horizontal direction and 576 scanning lines in the vertical direction. In a similar manner, effective pixels of the (R-Y) signal per one field are represented by 360 pixels in the horizontal direction and 288 scanning lines in the vertical direction, and effective pixels of the (B-Y) signal per one field are represented by 360 pixels in the horizontal direction and 288 scanning lines in the vertical direction.

The output signals of the data rate conversion circuit 3 are applied to the blocking circuit 4 in FIG.3, and the data rate of the HDTV signal is made to about three times of the data rate of the PAL signal. Therefore, three memories 61, 62 and 63 in the blocking circuit 4 are used for rearranging the data of the HDTV signal. Referring to FIG. 3, the signals of address data output from the write address control circuit 64 and the read address control circuit 65 are applied to the three memories 61, 62 and 63.

The Y signal of the HDTV signal is applied to the FIFOs 54, 55 and 56 through the terminal 51. Moreover, the (R-Y)

signal is applied to the FIFO 57 through the terminal 52, and the (B-Y) signal is applied to the FIFO 58 through the terminal 53. The input data are converted in the data rate and are formed to data block by these FIFOs 54 - - - 58. In the Y signal, one horizontal scanning line of the video image is divided into a plurality of sections each having 24 pixels, and the section having the 24 pixels is divided into three data groups each having 8 pixels. The three data groups are applied to the FIFOs 54, 55 and 56, respectively. Subsequently, the three data groups are simultaneously output from the FIFOs 54, 55 and 56. The output data of the FIFO 54 is applied to the memory 61 through the selector 59, the output data of the FIFO55 is applied to the memory 62 through the selector 60, and the output data of the FIFO 56 is applied to the memory 63.

The (R-Y) signal and (B-Y) signal are alternately input to the blocking circuit 4 by skipping one horizontal scanning line. In the (R-Y) signal and (B-Y) signal, one horizontal scanning line of the video image is divided into a plurality of segments each having 8 pixels. The data of the (R-Y) signal of a segment and the data of the (B-Y) signal of a segment at the same vertical position on neighboring two horizontal scanning lines are simultaneously output from the FIFO 57 and the FIFO 58. The output data of the FIF0 57 is applied to the memory 61 through the selector 59. Moreover, the output data of the FIFO 58 is applied to the memory 62 through the selector 60. The Y signal and the (R-Y) and (B-Y) signals are inputted to the three memories 61, 62 and 63 in turn.

Subsequently, data of two mini-blocks are output from the first blocking circuit 76. The data of the first mini-block represent the Y signal of a segment having 24 pixels on one horizontal scanning line. The data of the second mini-block represent the (R-Y) signal of a segment having 8 pixels and the (B-Y) signal of a segment having 8 pixels on two horizontal scanning lines.

The data of the Y signal, the (R-Y) signal and the (B-Y) signal are written in the memories 61, 62 and 63 in units of one block of data on the basis of the control signal of the write address control circuit 64. The written data are read out of the memories 61, 62 and 63 on the basis of the control signal of the read address control circuit 65, and thereby macro blocks are formed. The macro blocks are applied to the FIFO 66, FIFO 67 and FIFO 68 or the FIFO 69, FIF0 70 and FIF0 71.

Figure 8:
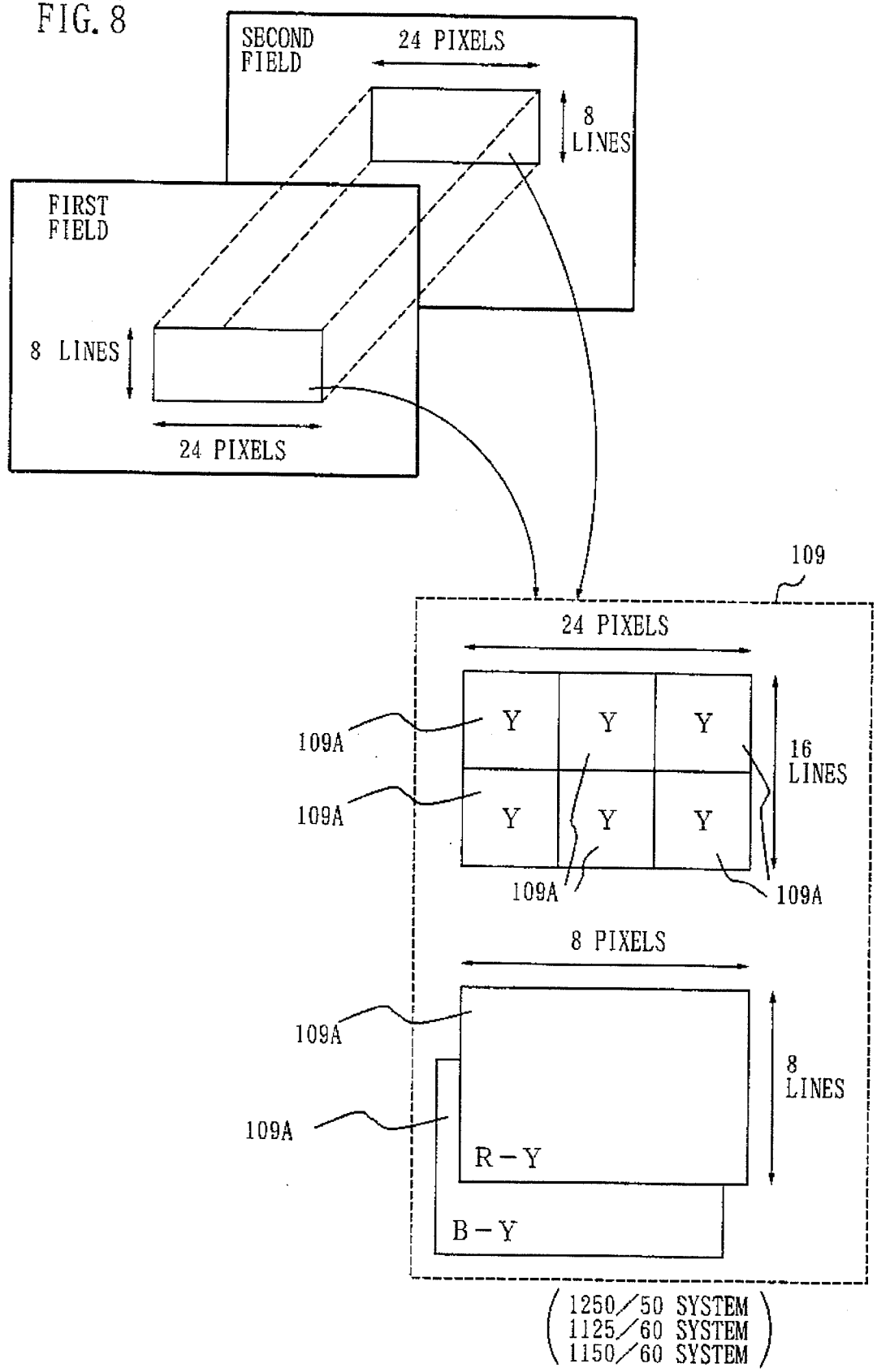
FIG. 8 is a diagram representing a macro block of one frame of the 1250/50 system and 1125/60 system in the apparatus for recording and reproducing the digital video signal.

FIG. 8 is a diagram of the macro block 109 in the 1250/50 system, 1125/60 system and 1050/60 system. One DCT block 109A comprises data of 4 horizontal segment each having 8 pixels per one field. Consequently, the number of data is represented by 8×4×2 per one frame. The data of the Y signal is comprised of 6 DCT blocks. In a similar manner, each of the (R-Y) signal and the (B-Y) signal is comprised of one DCT block. Consequently, the macro block 109 is comprised of data of 16 horizontal segments each having 24 pixels on 16 horizontal scanning lines. The number of data per one macroblock is represented by the product of 24 by 16.

In FIGS. 7 and 8, the ratio of the number of pixel (64 pixels) in the color difference signal in one macro block 109 of 1250/50 system to the number of pixel (64 pixels) in the color difference signal in one macro block 108 of 625/50 system is made to a predetermined natural number "m". The number "m" is "1" in the first embodiment.

Detailed configuration of the macro block 109 is shown in FIG. 15. Referring to FIG. 15, the DCT blocks 171 - - - 176 are data blocks of the Y signal, and DCT blocks 177 and 178 are data blocks of the (R-Y) signal and the (B-Y) signal, respectively. In the macro block 109 shown in FIG. 15, a first mini-block is composed of data of 24 pixels in the top line of the three DCT blocks 171, 172 and 173 such as "$Y_{0,0}$, . . ., $Y_{0,7}$; $Y_{0,8}$, . . ., $Y_{0,15}$; $Y_{0,16}$, . . ., $Y_{0,23}$". The data of the first mini-block is input to the FIFOs 66, 67 and 68 from the memories 61, 62 and 63 in FIG.3. Subsequently, data of a second mini-block is composed of data $r_{0,0}$, . . ., $r_{0,7}$; $b_{0,0}$, . . ., $b_{0,7}$ of the DCT block 177 and 178, for example. The data of the second mini-block is input to the FIFOs 66 and 67. Consequently, the data of the DCT blocks 171, 174 and 177 are input to the FIFO 66, the data of the DCT blocks 172, 175 and 178 are input to the FIFO 67, and the data of the DCT blocks 173 and 176 are input to the FIFO 68. The data of the DCT blocks 171 178 are output from the FIFOs 66 - - - 68 to the terminal 74 in a predetermined order through the selector 72.

In the above-mentioned operation, the data of 24 pixels are divided into three groups each having 8 pixels. The three groups of data are simultaneously written at the same address in the three memories 61, 62 and 63 by the control signal of the write address control circuit 64. In read-out operation, three groups of data are simultaneously read out of the memories 61, 62 and 63 by the control signal of the read address control circuit 65. The data of 8 pixels of (R-Y) signal and the data of 8 pixels of (B-Y) signal are also simultaneously written at the same address of the memories 61 and 62, and are simultaneously read out therefrom. Therefore, the three memories 61, 62 and 63 may be controlled by a single control signal, and the write address control circuit 64 and read address control circuit 65 are simplified.

Figure 10:
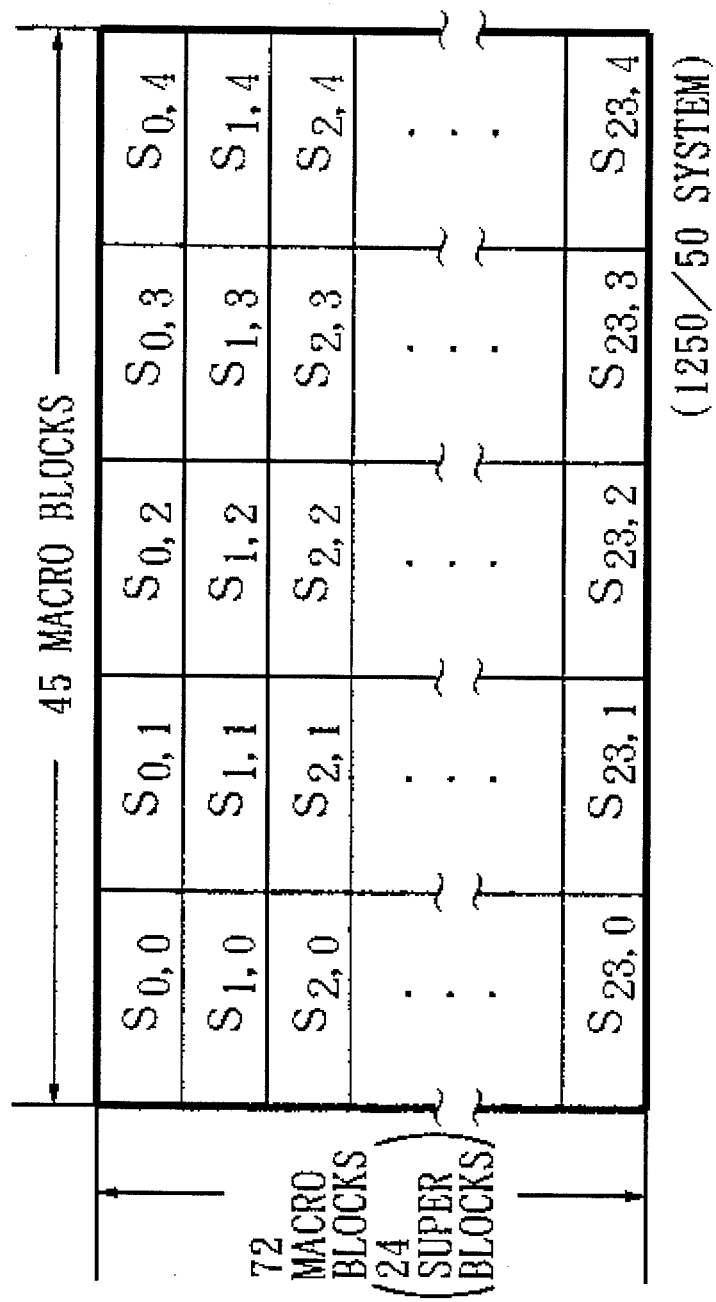
FIG. 10 is a diagram representing the arrangement of super blocks in one frame of the 1250/50 system in the apparatus for recording and reproducing the digital video signal of the first embodiment.
Figure 11:
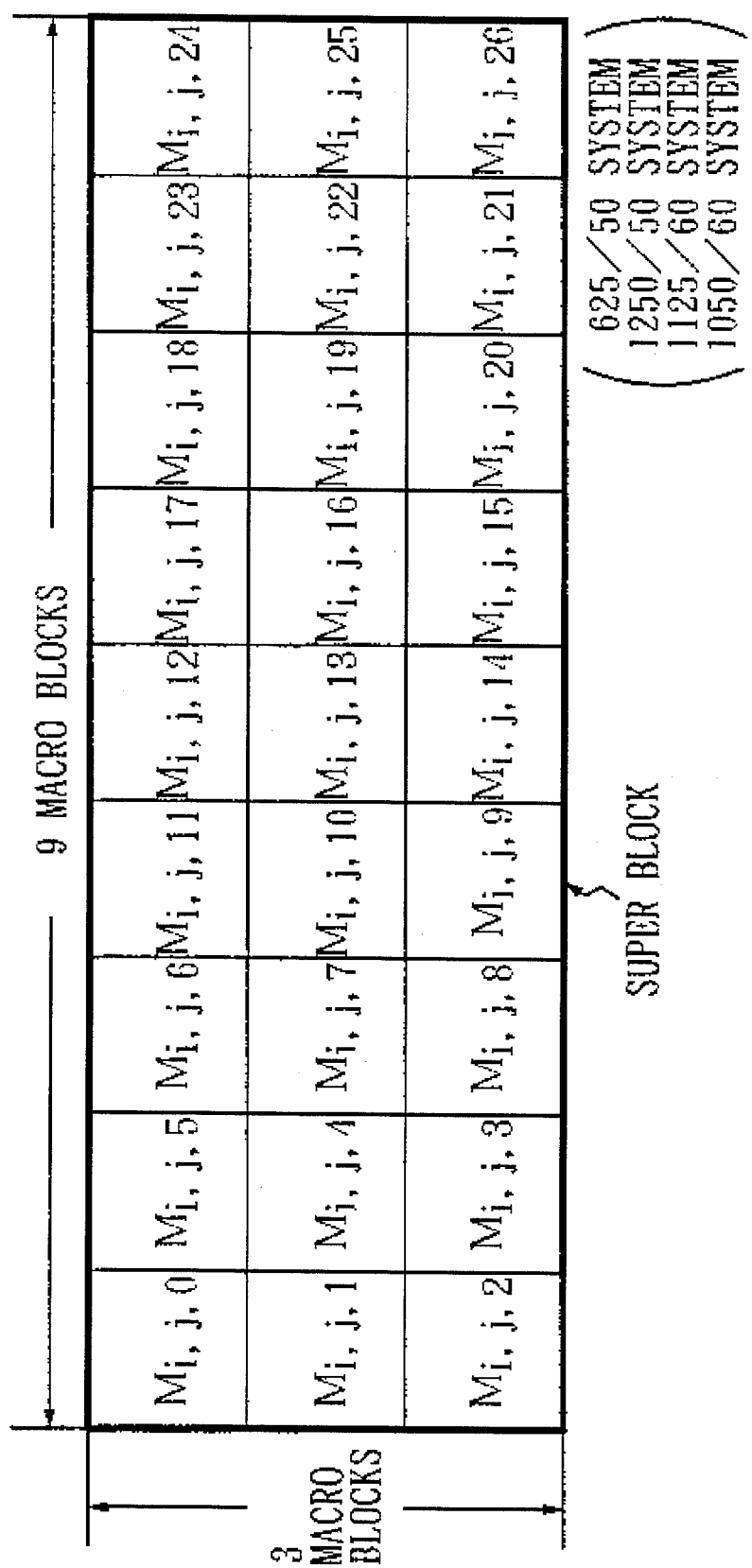
FIG. 11 is a diagram representing the arrangement of macro blocks in a super block in the apparatus for recording and reproducing the digital video signal of the first embodiment.

FIG. 10 is a diagram of the arrangement the of super blocks in one frame of, the video image of the 1250/50 system. The video image of one frame is divided into a plurality of super blocks as shown in FIG. 10. The video image of one frame comprises 45 macro blocks in the horizontal direction and 72 macro blocks in the vertical direction. The video image of one frame is divided into 5 sections in the horizontal direction and 24 sections in the vertical direction. Consequently, the video image of one frame is divided into 120 super blocks as shown in FIG. 10. A super block is represented by "$S_{i,j}$ (i=0, 1, . . ., 22, 23; J=0, . . ., 4). Each super block $S_{i,j}$ comprises 27 macro blocks $M_{i,j,k}$ (k=0, 1, . . ., 25, 26) as shown in FIG. 11.

In FIG. 9 and FIG. 10, the ratio of the number of the super blocks in one frame of the 1250/50 system to the number of the super blocks in one frame of the 625/50 system is made to a predetermined natural number "n". The number of macro blocks in one super block of the 1250/50 system is equal to that of the 625/50 system. Therefore, the ratio of the number of macro blocks in one frame of the 1250/50 system to the number of macro blocks in one frame of the 625/50 system is "n". The number "n" is "2" in the first embodiment.

The data of macro blocks output from the terminal 74 in FIG. 3 are formed to a video segment $V_{i,k}$. One video segment comprises 5 macro blocks and arrangement of the macro blocks in each video segment is represented by Equation (4).

$$V_{i,k} = \{M_{(i+4) \bmod 24, 2, k},  \quad (4)$$
$$M_{(i+12) \bmod 24, 1, k},$$
$$M_{(i+16) \bmod 24, 3, k},$$
$$M_{(i+0) \bmod 24, 0, k},$$
$$M_{(i+8) \bmod 24, 4, k}\},$$

$$(i = 0, 2, 4, 6, \ldots, 20, 22; \quad k = 0, \ldots, 26).$$

Referring to Equation (4), the data of macro blocks of which subscript "i" is an even number are output from the terminal 74.

The data of macro blocks output from the terminal 75 are also formed to a video segment. The arrangement of the macro blocks in each video segment is represented by Equation (5).

$$V_{i,k} = \{ M_{(i+4) \bmod 24, 2, k}, \qquad (5)$$
$$M_{(i+12) \bmod 24, 1, k},$$
$$M_{(i+16) \bmod 24, 3, k},$$
$$M_{(i+0) \bmod 24, 0, k},$$
$$M_{(i+8) \bmod 24, 4, k} \},$$

$$(i = 1, 3, 5, 7, \ldots, 21, 23; \quad k = 0, \ldots, 26).$$

Referring to Equation (5), the data of macro blocks of which subscript "i" is an odd number are output from the terminal 75.

Referring to FIG. 1, the block data output from the terminal 74 is input to the first coding circuit 5, and the block data output from the terminal 75 is input to the second coding circuit 6.

In the first coding circuit 5 and the second coding circuit 6, the rate of data compression of the HDTV signal is about 4/3 times as large as the PAL signal. The data output from the first coding circuit 5 and the second coding circuit 6 are applied to the first SYNC block data generation circuit 7 and the second SYNC block data generation circuit 8, respectively.

Figure 12B:
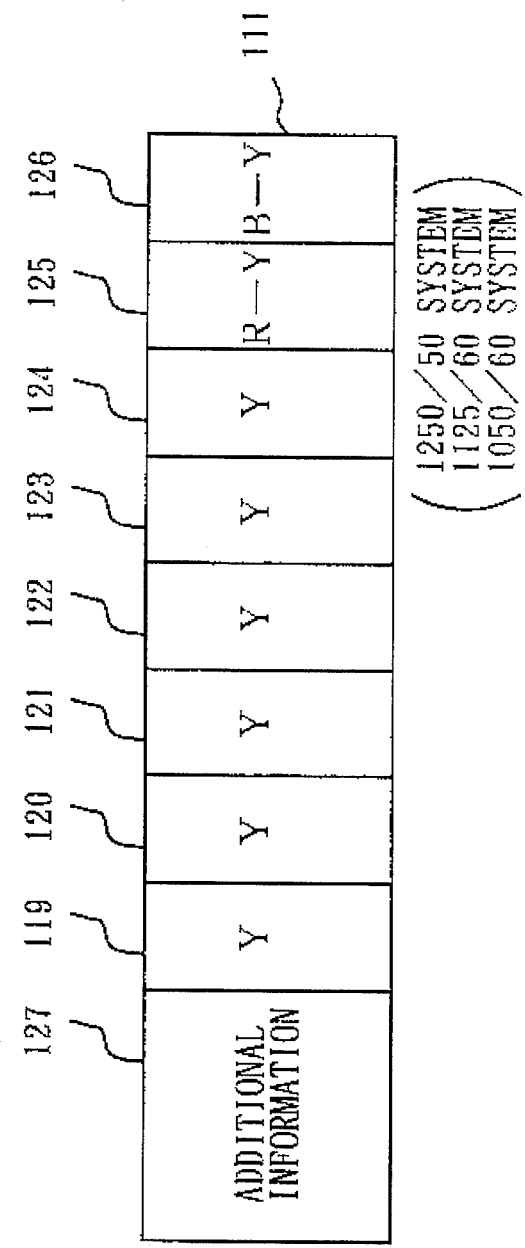
FIG. 12B is a diagram representing SYNC block data of the 1250/50 system in the apparatus for recording and reproducing the digital video signal of the first embodiment.

In the SYNC block data generation circuits 7 and 8 shown in FIG. 5, the memory 94 comprises a plurality of areas of SYNC block data 111 as shown in FIG. 12B. One SYNC block data 111 corresponds to one macro block $M_{i,j,k}$. The coded data of a macro block $M_{i,j,k}$ are stored in predetermined image data areas 119 - - - 126 in units of one DCT block. In the storing operation, the low frequency component of the data of video image has priority. Data which overflows from an image data area is stored in other image data area having space in the same image data areas 119 - - - 126. Data which overflows from the image data areas 119 - - - 126 are stored in areas of other SYNC block data. Additionally, the data of "additional information" 127 is also stored.

Consequently, the coded data of a macro block $M_{i,j,k}$ is stored in a corresponding SYNC block data 111.

Referring to FIG. 5, the SYNC block data 111 is read out from the memory 94 in compliance with the control signal of the read address control circuit 93, and is output to the terminal 95. The output data of the first SYNC block data generation circuit 7 and the second SYNC block data generation circuit 8 are inputted to the first recording signal processing circuit 9 and tile second recording signal processing circuit 10, respectively. A SYNC block data is represented by $U_{i,j,k}$, and one SYNC block data $U_{i,j,k}$ comprises main components of the data after data compression operation of one macro block $M_{i,j,k}$.

In the first recording signal processing circuit 9 and the second recording signal processing circuit 10, a predetermined SYNC pattern and ID data are attached to the SYNC block data, and is output to the terminal 107. Subsequently, the SYNC block data are applied to the recording heads 13A, 13B, 14A and 14B through the respective recording amplifiers 11 and 12, and are recorded in the magnetic tape 15.

Figure 14:
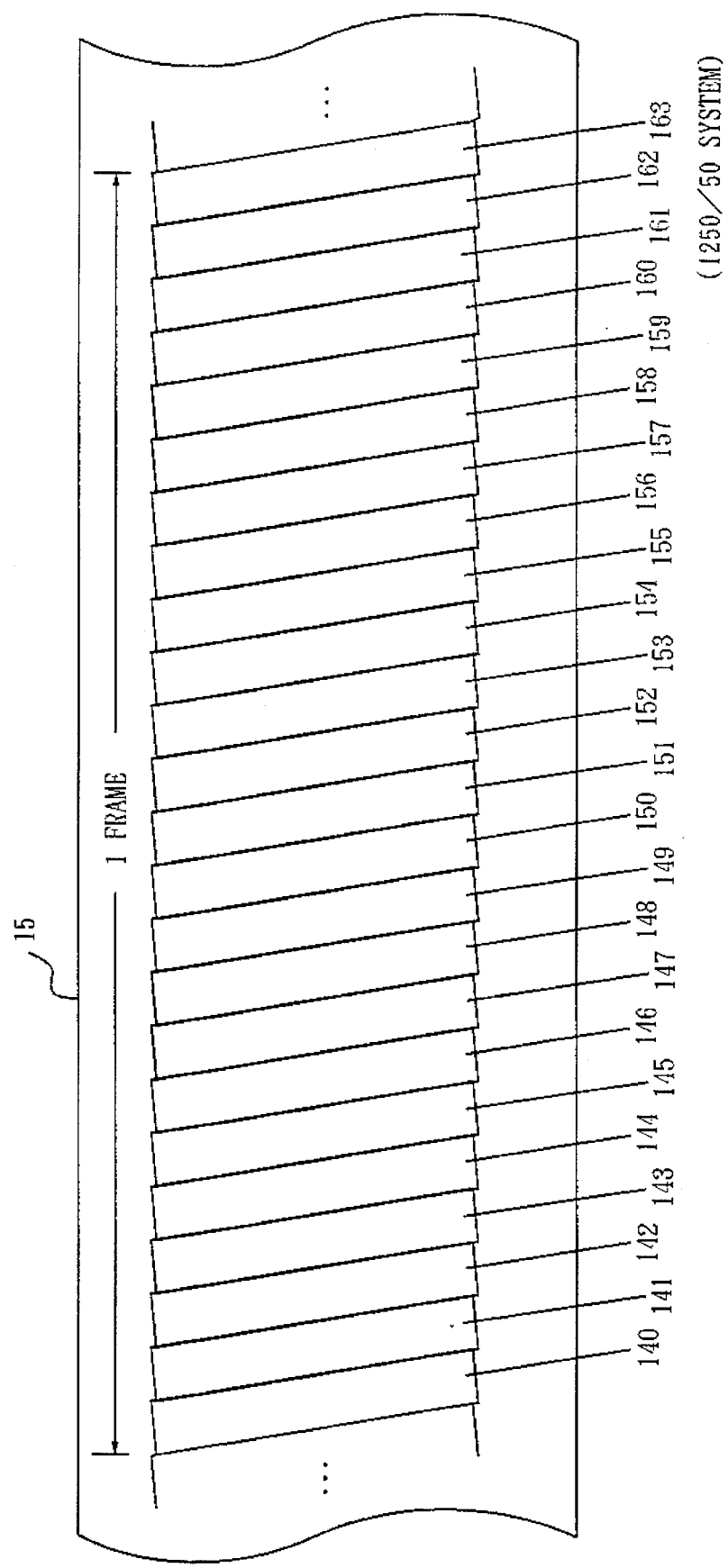
FIG. 14 is a block diagram representing video tracks in the magnetic tape on which a video signal of 1250/50 system is recorded in the apparatus for recording and reproducing the digital video signal of the first embodiment.

The recording operation of the HDTV signal is performed by the first combination heads 13A and 14A and the second combination heads 13B and 14B. The tape moving speed for recording the HDTV signal is substantially as fast as twice the tape moving speed in the PAL signal. Two recording tracks are formed by first combination heads 13A and 14A during a half revolution period of the rotating cylinder, and successive two recording tracks neighboring to the former two recording tracks are formed by the second combination heads 13B and 14B during successive half revolution period. Consequently, the video signal of one frame is recorded in 24 video tracks 140 - - - 163 as shown in FIG. 14. Referring to FIG. 14, the video tracks of even number are formed by heads 13A and 13B and the video tracks of odd number are formed by heads 14A and 14B.

The order of the SYNC block data of data $T_i$ which are recorded on a video track of the number "i" in the 24 video tracks is represented by Equation (6).

$$T_i = \{ U_{i,0,0}, \ldots, U_{i,0,26}, \qquad (6)$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26} \},$$

$$(i = 0, \ldots, 23).$$

As mentioned above, in the apparatus for recording and reproducing the digital video signal in the first embodiment, when the PAL signal or the HDTV signal is input to the input terminal 1 or 2, respectively, the switches 37, 38 and 39 are activated by a control circuit (not shown), and the input video signal is applied to the FIFOs 40 - - - 44 and the above-mentioned operation performed.

[Reproducing operation in the first embodiment]

In the apparatus for recording and reproducing the digital video signal in the first embodiment, the reproducing operation of the recorded data is described hereafter with reference to FIG. 1. The recorded data is reproduced by reproducing combination heads 16A, 17A and 16B, 17B, and are applied to a first reproducing signal processing circuit 20 and a second reproducing signal processing circuit 21 through respective amplifiers 18 and 19. The reproduced SYNC block data is converted to the coded data in the units of one macro block in a first coded data restoration circuit 22 or a second coded data restoration circuit 23. Subsequently, the coded data is converted to the original macro block data in a first decoding circuit 24 or a second decoding circuit 25. The macro block data is converted to an analog signal by a deblocking circuit 26 and a data rate inversion circuit 27, and the analog PAL signal is output to a terminal 28. On the other hand, in a similar manner, a reproduced HDTV signal is output to a terminal 29. The circuit configuration for the reproducing operation as shown in FIG. 1 is well known in the art, and the detailed description is omitted.

Though the HDTV signal of 1250/50 system is converted to the known 12:4:0 format in the above-mentioned embodiment, the HDTV signal may be converted to the known 16:8:0 format. In this case, one macro block comprises 8 DCT blocks of the Y signals, 2 DCT blocks of the (R-Y) signal and 2 DCT blocks of the (B-Y) signal. One macro block is made to correspond to one SYNC block data in the 16:8:0 format. The ratio of the number of macro blocks of HDTV signal to that of the PAL signal is 2:1, and the recording operation may be performed by the above-mentioned circuit configuration as shown in FIG. 1.

[Second embodiment of blocking circuit]

Figure 16:
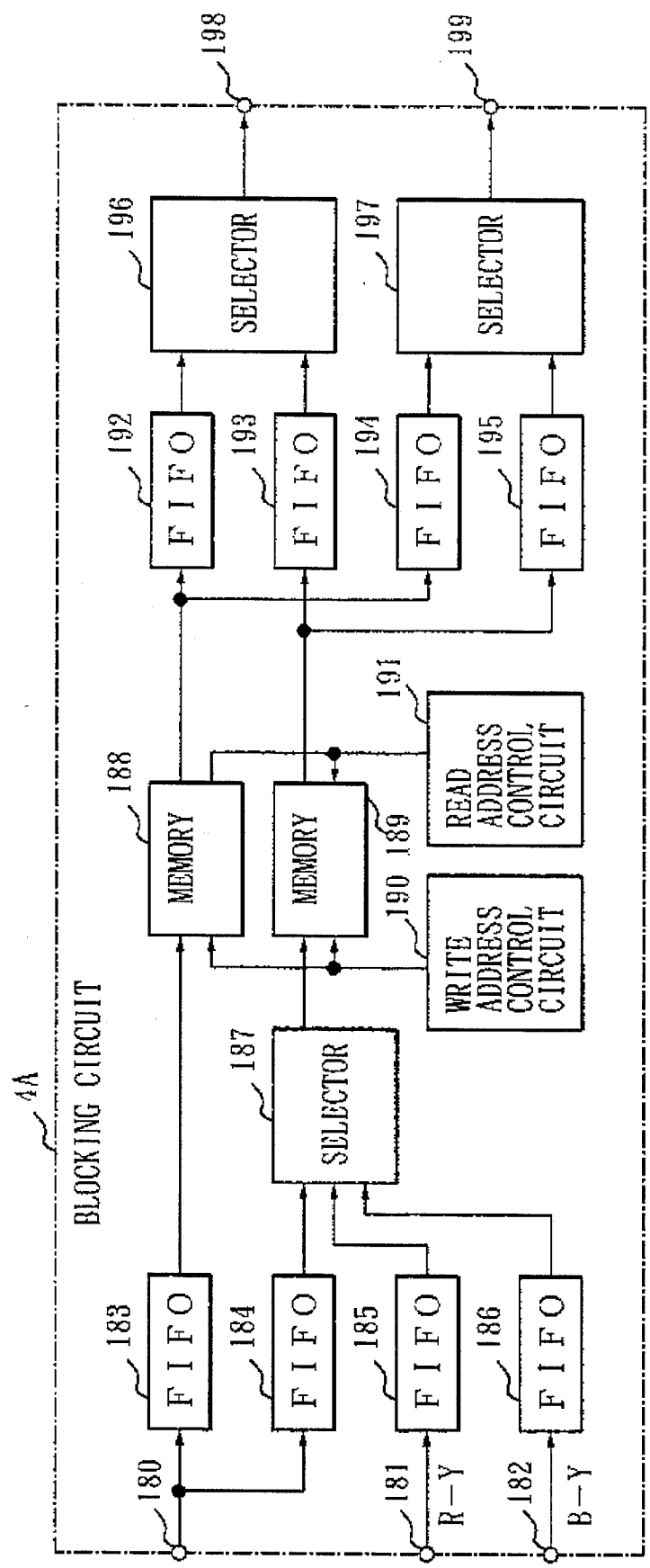
FIG. 16 is a block diagram of a second example of the blocking circuit in the apparatus for recording and reproducing the digital video signal of the first embodiment.

The second example of the blocking circuit 4A is shown in FIG. 16. Referring to FIG. 16, terminals 180, 181 and 182 correspond to the terminals 51, 52 and 53 in FIG. 3, respectively. Terminals 198 and 199 correspond to the terminals 74 and 75 in FIG. 3, respectively. Since the operation of the blocking circuit 4A in the PAL signal is similar to the operation in the blocking circuit 4 shown in FIG. 3, the description is omitted.

In the signal processing operation of the HDTV signal, two memories 188 and 189 are used in parallel to rearrange the data of the HDTV signal. In operation, common address data are applied to two memories 188 and 189 from a write address control circuit 190 or a read address control circuit 191 to control the two memories 188 and 189.

The Y signal is applied to FIFOs 183 and 184 through a terminal 180, the (R-Y) signal is applied to an FIFO 185 through a terminal 181 and the (B-Y) signal is applied to an FIFO 186 through a terminal 182. The data rate of input data is converted by the FIFOs 183 - - - 186, and block data are formed. In the Y signal, one horizontal line is divided into plural sections each having 24 pixels. Moreover, the 24 pixels are divided into 16 pixels and 8 pixels. The data of 16 pixels is input to the FIFO 183, and the data of 8 pixels is input to the FIFO 184. In the (R-Y) signal and (B-Y) signal, one horizontal line is divided into plural sections each having 8 pixels.

Subsequently, the data of 8 pixels is output from the FIFO 184 in synchronism with output of the data of 16 pixels from the FIFO 183. Moreover, the data of 8 pixels is output from the FIF0 185 or the FIFO 186. Since the (R-Y) signal and the (B-Y) signal exist on alternate horizontal lines, the data of the (R-Y) signal or the (B-Y) signal, which exists on each horizontal line, is input to the selector 187. The Y signal of 16 pixels is inputted to the memory 188, and the Y signal of 8 pixels and the (R-Y) signal or the (B-Y) signal of 8 pixels are input to the memory 189 through the selector 187. Consequently, data of a mini-block comprising Y signal of 24 pixels and the (R-Y) signal of 8 pixels and the (B-Y) signal of 8 pixels in one horizontal line are written in two memories 188 and 189 on the basis of the control signal of the write address control circuit 190.

Subsequently, the stored data are read out from the memories 188 and 189 on the basis of the control signal of the read address control circuit 191, and are input to an FIFO 192 or an FIFO 194 in units of macro block. Moreover, the data read out from the memory 189 is input to an FIFO 193 or an FIFO 195 in units of macro block.

In FIG. 15, a mini-block is composed of the data of pixels $Y_{0,0}, \ldots, Y_{0,23}$ and $r_{0,0}, \ldots, r_{0,7}$ or a mini-block is composed of the data of pixels $Y_{0,0}, \ldots, Y_{0,23}$ and $b_{0,0}, \ldots, b_{0,7}$, for example. The data of each macro block is output to a terminal 198 through a selector 196 or output to a terminal 199 through a selector 197. The orders of macro blocks output from the terminals 198 and 199 are shown by Equations (4) and (5), respectively.

[Third embodiment of blocking circuit]

Figure 17:
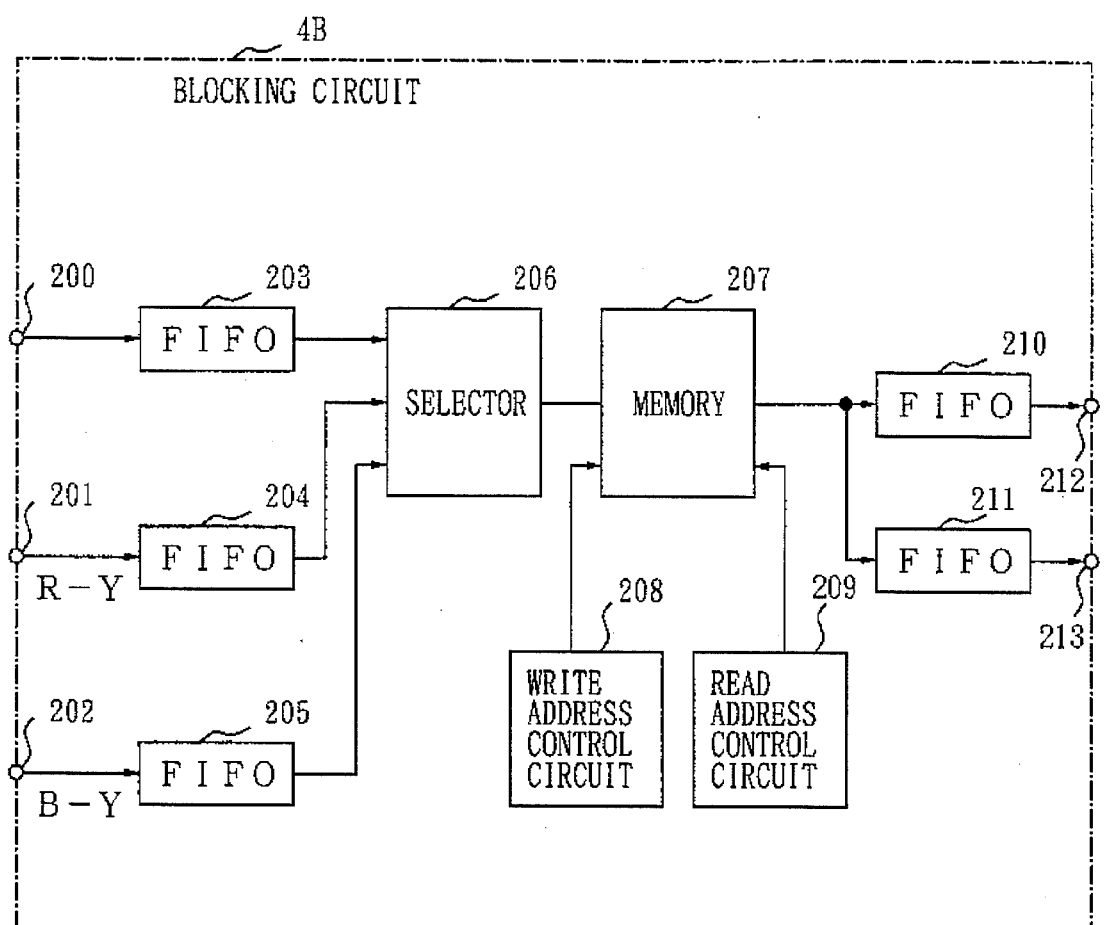
FIG. 17 is a block diagram of a third example of the blocking circuit in the apparatus for recording and reproducing the digital video signal of the first embodiment.

FIG. 17 is a block diagram of a third example of blocking circuit 4B. Referring to FIG. 17, terminals 200, 201 and 202 correspond to the terminals 51, 52 and 53 as shown in FIG. 3, respectively. Terminals 212 and 213 correspond to the terminals 74 and 75 as shown in FIG. 3, respectively. Signal processing operation of the PAL signal is similar to that of the first example of the blocking circuit 4, and the description is omitted.

The signal processing operation of the HDTV signal is described hereafter. In the blocking circuit 4B, one memory 207 is used to rearrange the data. The Y signal is input to FIF0 203 through the terminal 203. Moreover, the (R-Y) signal is input to an FIFO 204 through the terminal 201, and the (B-Y) signal is input to an FIFO 205 through the terminal 202. The inputted data are formed to block data by FIFOs 203, 204 and 205. In Y signal, one horizontal line of the video image is divided into plural sections each having 24 pixels. In the (R-Y) signal and (B-Y) signal, one horizontal line is divided into plural sections each having 8 pixels. The Y signal of 24 pixels is written in the memory 207 through a selector 206. Moreover, the (R-Y) signal or the (B-Y) signal of 8 pixels is alternately written in the memory 207 through the selector 206. Consequently, the data of the mini-block comprising the Y signal of 24 pixels and the (R-Y) signal or Y signal of 24 pixels and (B-Y) signal of 8 pixels are stored in the memory 207 on the basis of a control signal of a write address control circuit 208.

Subsequently, the stored data are read out from the memory 207 on the basis of a control signal of a read address control circuit 209 so as to form macro blocks, and are applied to an FIFO 210 or an FIF0 211.

For example, the mini-block is composed of data of pixels $Y_{0,0}, \ldots, Y_{0,20}$ and $r_{0,0}, \ldots, r_{0,7}$, or data of $Y_{0,0}, \ldots, Y_{0,23}$ and $b_{0,0}, \ldots, b_{0,7}$. The data of each macro block are output to terminals 212 and 213. The orders of the macro blocks output from the terminals 212 and 213 are represented by Equations (4) and (5), respectively.

In the apparatus for recording and reproducing the digital video signal in the first embodiment, the NTSC signal (525/60 system) is inputted as the first video signal. The second video signal is the HDTV signal (1050/60 system).

[Recording operation of NTSC signal]

Figure 18:
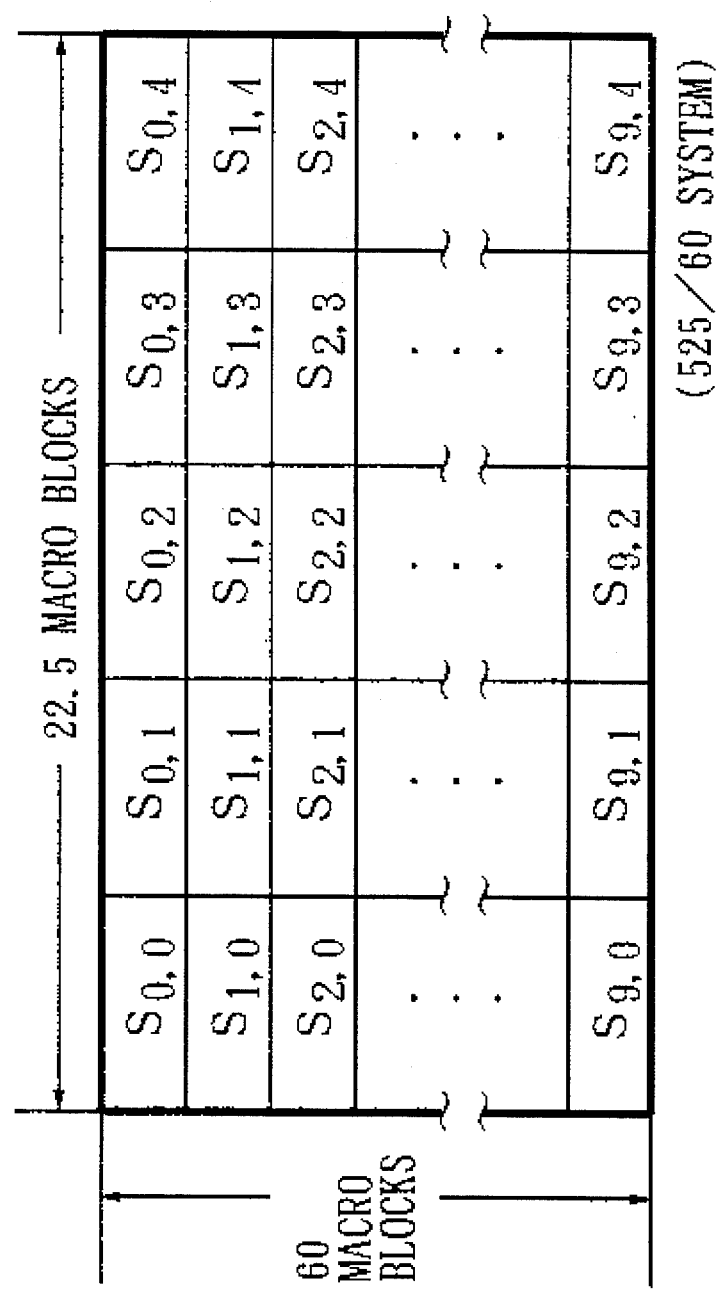
FIG. 18 is a diagram representing the arrangement of super blocks in one frame of the video signal of the 525/60 system in the apparatus for recording and reproducing the digital video signal of the first embodiment.

Referring to FIG. 1, the NTSC signal is input to the terminal 1 of the data rate conversion circuit 3. In FIG. 2, the FIFOs 40 - - - 44 serve as delay elements for delaying a time period corresponding to several pixels, and a digital video signal of the known 4:1:1 format is output from the terminals 47 - - - 49. In the blocking circuit 4 shown in FIG. 3, the video image of one frame is converted to macro blocks of 4:1:1 format, and the order of the macro block $M_{i,j,k}$ (i=0, 1, ..., 8, 9; j=0, 1, 3, 4; k=0, 1, ..., 25, 26) is set. Moreover, the video image of one frame is divided into 22.5 macro blocks in the horizontal direction and 60 macro blocks in the vertical direction, and divided into 50 super blocks $S_{i,j}$ as shown in FIG. 18. The above-mentioned blocking operation is realizable by the blocking circuit 4A or 4B shown in FIG. 16 and FIG. 17, respectively. By the above-mentioned blocking operation, video segments $V_{i,k}$ represented by Equations (7) and (8) are output.

$$V_{i,k} = \{M_{(i+2) \bmod 10, 2, k}, \qquad (7)$$
$$M_{(i+6) \bmod 10, 1, k},$$
$$M_{(i+8) \bmod 10, 3, k},$$
$$M_{(i+0) \bmod 10, 0, k},$$
$$M_{(i+4) \bmod 10, 4, k}\},$$

$$(i = 0, 2, \ldots, 8; \quad k = 0, \ldots, 26).$$

$$V_{i,k} = \{M_{(i+2) \bmod 10, 2, k}, \qquad (8)$$
$$M_{(i+6) \bmod 10, 1, k},$$
$$M_{(i+8) \bmod 10, 3, k},$$
$$M_{(i+0) \bmod 10, 0, k},$$
$$M_{(i+4) \bmod 10, 4, k}\},$$

$$(i = 1, 3, \ldots, 9; \quad k = 0, \ldots, 26).$$

As shown in the Equation (7), the macro blocks $M_{i,j,k}$ in the super blocks $S_{i,j}$ having an even number in the vertical direction are output from the terminal 74. Moreover, as shown in the Equation (8), the macro blocks $M_{i,j,k}$ in the super blocks $S_{i,j}$ having odd number in the vertical direction are output from the terminal 75.

The data of one video segment represented by the Equation (7) are processed, in a manner similar to the first embodiment, by the first coding circuit 5, the first SYNC block data generation circuit 7 and the first recording signal processing circuit 9, and are applied to the heads 13A and 13B through the recording amplifier 11. The data of the other video segment data are processed by the second coding circuit 6, the second SYNC block data generation circuit 8 and the second recording signal processing circuit 10, and are applied to the heads 14A and 14B through the recording amplifier 12. In a manner similar to the first embodiment, one SYNC block data $U_{i,j,k}$ comprises the main components of data after data compression of one macro block $M_{i,j,k}$, and the video signal of one frame is recorded in ten video tracks of the magnetic tape 15. The order of the SYNC block data of the data $T_i$ which are recorded in the video track having the number "i" is represented by Equation (9).

$$T_i = \{U_{i,0,0}, \ldots, U_{i,0,26}, \qquad (9)$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26}\},$$

$$(i = 0, \ldots, 9).$$

[Recording operation of HDTV signal (1050/60 system)]

Subsequently, recording operation of the HDTV signal of 1050/60 system is described hereafter. In the data rate conversion circuit 3 of FIG. 1, the Y signal of one frame is converted to data of the product of 1080 pixels in the horizontal direction by 960 lines in the vertical direction, the (R−Y) signal is converted to the data of the product of 360 pixels in the horizontal direction by 480 lines in the vertical direction and the (B−Y) signal is converted to the data of the product of 360 pixels in the horizontal direction by 480 lines in the vertical direction. Consequently, the video image of one frame is converted to the digital data of the known 12:4:0 format.

Figure 19:
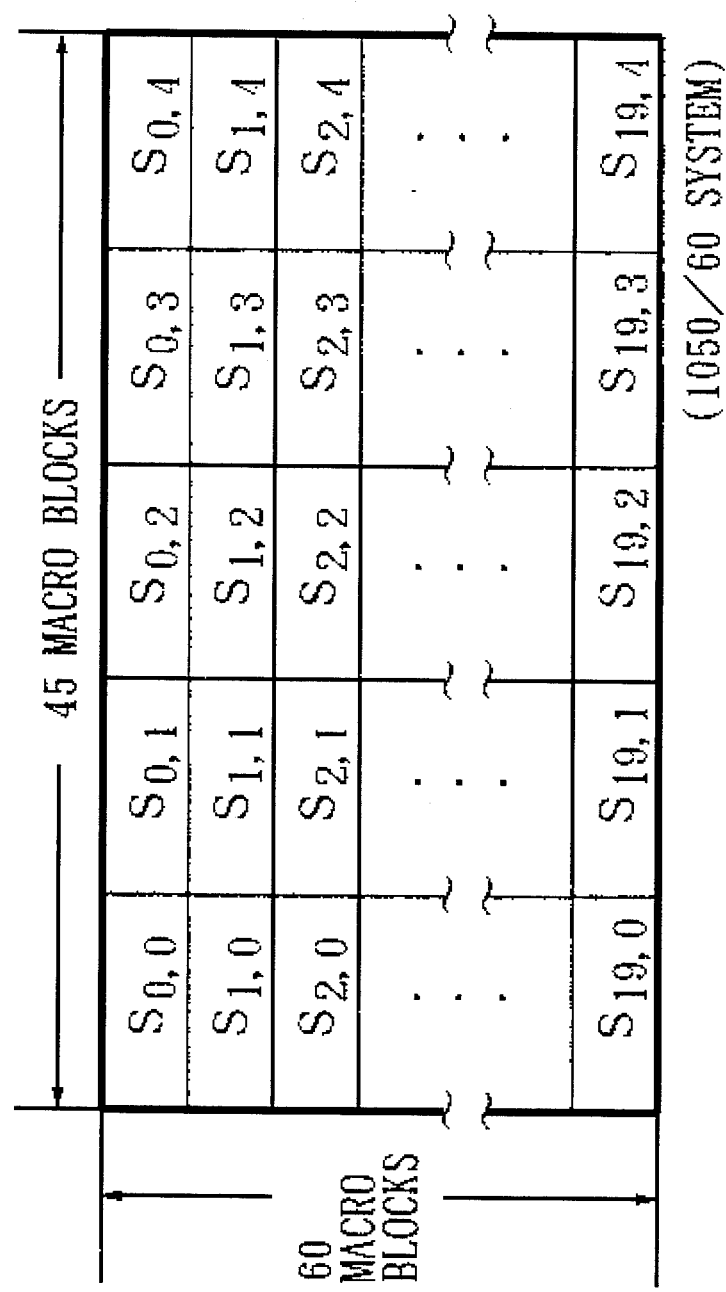
FIG. 19 is a diagram representing the arrangement of super blocks in one frame of the video signal of the 1050/60 system in the apparatus for recording and reproducing the digital video signal of the first embodiment.

In the blocking circuit 4, the video image of one frame is divided into 45 sections in the horizontal direction and 60 sections in the vertical direction. Consequently, the video image of one frame is divided by the macro block 109 as shown in FIG. 8. Moreover, as shown in FIG. 19, the video image of one frame is divided into a plurality of super blocks $S_{i,j}$. The arrangement of the macro blocks $M_{i,j,k}$ (i=0, 1, . . . , 19; J=0, 1, 2, 3, 4; k=0, 1, . . . , 26) in one super block $S_{i,j}$ is shown in FIG. 11. The video segments $V_{i,k}$ output from two terminals 74 and 75 of the blocking circuit 4 are represented Equations (10) and (11), respectively.

$$V_{i,k} = \{M_{(i+4) \bmod 20, 2, k}, \qquad (10)$$
$$M_{(i+12) \bmod 20, 1, k},$$
$$M_{(i+16) \bmod 20, 3, k},$$
$$M_{(i+0) \bmod 20, 0, k},$$
$$M_{(i+8) \bmod 20, 4, k}\},$$

$$(i = 0, 2, \ldots, 16, 18; \quad k = 0, \ldots, 26).$$

$$V_{i,k} = \{M_{(i+4) \bmod 20, 2, k}, \qquad (11)$$
$$M_{(i+12) \bmod 20, 1, k},$$
$$M_{(i+16) \bmod 20, 3, k},$$
$$M_{(i+0) \bmod 20, 0, k},$$
$$M_{(i+8) \bmod 20, 4, k}\},$$

$$(i = 1, 3, \ldots, 17, 19; \quad k = 0, \ldots, 26).$$

As shown by the Equation (10), the macro blocks $M_{i,j,k}$ in the super blocks $S_{i,j}$ having an even number in the vertical direction are output to the terminal 74. Moreover, as shown by the Equation (11), the macro blocks $M_{i,j,k}$ in an super blocks $S_{i,j}$ having the odd number in the vertical direction are output from the terminal 75.

As mentioned above, the video segments $V_{i,k}$ output from the blocking circuit 4 are processed in a manner similar to the first embodiment, and are applied to the heads 13A, 13B, 14A and 14B through the respective recording amplifiers 11 and 12.

One SYNC block data $U_{i,j,k}$ comprises the main components of the data after data compression of one macro block $M_{i,j,k}$, and the video signal of one frame is recorded in 20 video tracks of the magnetic tape 15. The order in which SYNC block data $U_{i,j,k}$ of the data $T_i$ are recorded in the video track having the number "i" is represented by Equation (12).

$$T_i = \{U_{i,0,0}, \ldots, U_{i,0,26}, \qquad (12)$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26}\},$$

$$(i = 0, \ldots, 19).$$

[Recording operation of HDTV signal (1125/60 system)]

In the apparatus for recording and reproducing the digital video signal as shown in FIG. 1, the HDTV signal of 1125/60 system is input to the terminal 2 of the data rate conversion circuit 3 as the second video signal. In the data rate conversion circuit 3, the Y signal of one frame is converted to the data of the product of the 1008 pixels in the horizontal direction by 1024 lines in the vertical direction, the (R−Y) signal is converted to the data of the product of 336 pixels in the horizontal direction by 512 lines in the vertical direction and the (B−Y) signal is converted to the data of the product of 336 pixels in the horizontal direction by 512 lines in the vertical direction. Consequently, the video image of one frame is converted to the digital video data of 12:4:0 format.

Figure 20A:
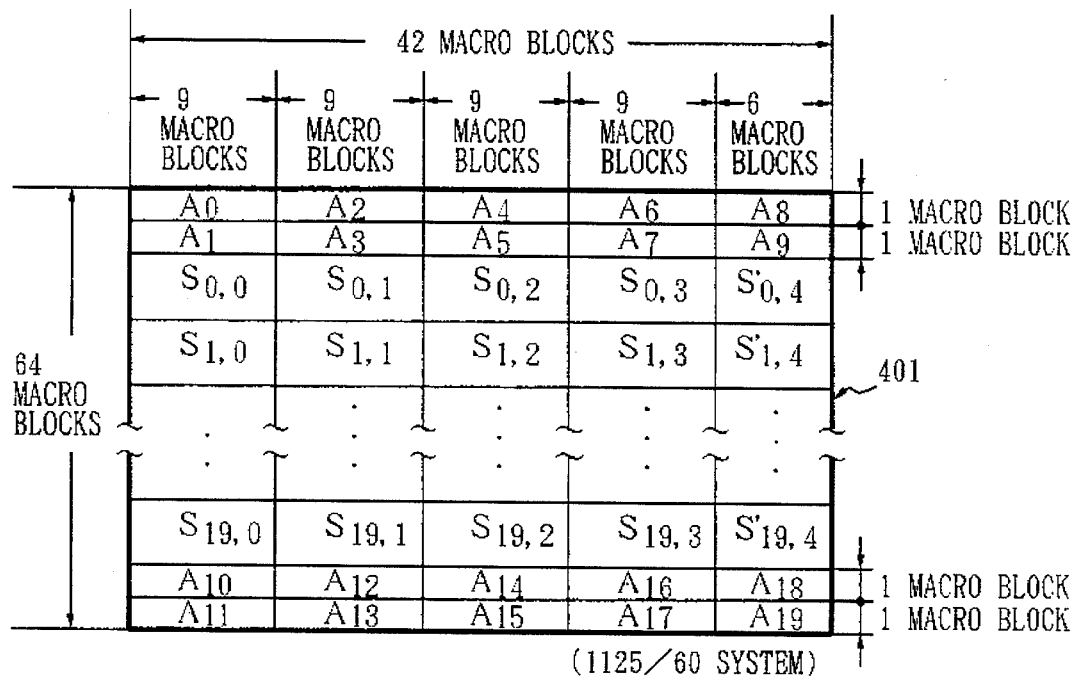
FIG. 20A is a diagram representing the arrangement of super blocks in one frame of the video signal of the 1125/60 system in the apparatus for recording and reproducing the digital video signal of the first embodiment.

In the blocking circuit 4, as shown in FIG. 20A, the video image 401 of one frame is divided into 42 sections in the horizontal direction and 64 sections in the vertical direction, and the macro blocks of the product of 42 by 64 (2688) are formed. Subsequently, the video image 401 of one frame is divided into super blocks $S_{i,j}$ (i=0, 1, . . . , 19; j=0, 1, 2, 3) having 9 macro blocks in the horizontal direction and 3 macro blocks in the vertical direction in the central portion of the video image 401. Subsequently, the area of 2 macro blocks in the vertical direction on the upper portion of the video image 401 is divided into sections each having 9 macro blocks in the horizontal direction and 1 macro block in the vertical direction, and hence blocks $A_0, A_1, A_2, A_3, A_4, A_5, A_6$ and $A_7$ are formed.

Figure 20B:
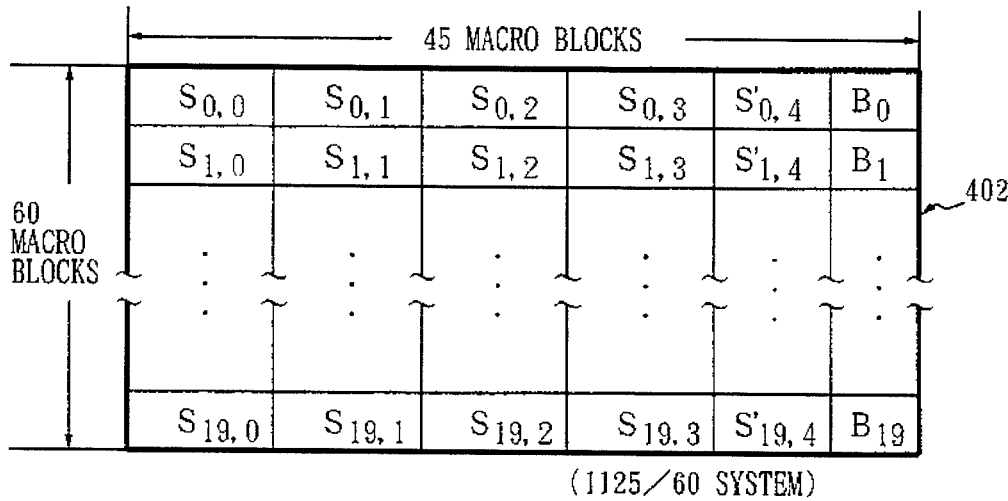
FIG. 20B is a diagram representing a changed arrangement of the super blocks shown in FIG. 20A.

Moreover, the area of 2 macro blocks in the vertical direction on the lower portion of the video image 401 is divided into sections each having 9 macro blocks in the horizontal direction and 1 macro block in the vertical direction, and blocks $A_{10}, A_{11}, A_{12}, A_{13}, A_{14}, A_{15}, A_{16}$ and $A_{17}$ are formed. Moreover, the right portion of the video image 401 is divided into super blocks $S'_{i,j}$ (i=0, 1, 2, . . . , 18, 19; j=4) of a first type which comprise 6 macro blocks in the horizontal direction and 3 macro blocks in the vertical direction. The upper portion and the lower portion of the right end part of the video image 401 is divided into blocks $A_8, A_9, A_{18}$ and $A_{19}$ of a second type each having 6 macro blocks in the horizontal direction and 1 macro block in the vertical direction. The blocks as shown in FIG. 20A are rearranged to the block arrangement of 45 macro blocks in the horizontal direction and 60 macro blocks in the vertical direction as shown in FIG. 20B. In the rearrangement operation, as shown in FIG. 20C, the block $A_i$ (i=0, 1, . . . , 7, 10, 11, . . . , 17) in the block configuration as shown in FIG. 20A is rearranged to a block $B_i$ of a third type as shown in FIG. 20D. Referring to FIG. 20C and FIG. 20D, a belt-shaped block $A_i$ is rearranged to a square block $B_i$. On the other hand, a belt-shaped block $A_i$ (i=1, 9, 18, 19) is also rearranged to a square block $B_i$, but the latter square block $B_i$ has only 6 macro blocks, and 3 blocks in the lower part of the block $B_i$ is filled with 3 "dummy macro blocks" D. The dummy macro blocks D have no video image data.

In FIG. 20B, the block $S'_{0,4}$ and the block $B_0$ are collected to a super block $S_{0,4}$. In a similar manner, the blocks $S'_{1,4}$ and $B_1$ are collected to $S_{1,4}$, the blocks $S'_{2,4}$ and $B_2$ are collected to $S_{2,4}$ and the blocks $S'_{19,4}$ and $B_{19}$ are collected to $S_{19,4}$. Consequently, blocks $S_{1,4}$, $S_{2,4}$, ..., $S_{19,4}$ are formed. By the above-mentioned rearrangement of the data block, the HDTV signal of 1125/60 system is converted to the same format as the HDTV signal of the above-mentioned 1050/60 system.

Therefore, the HDTV signal of the 1125/60 system may be processed in the order represented by the Equations (10) and (11). Finally, SYNC block data of the HDTV signal in the 1125/60 system are formed and the SYNC block data of one frame is recorded in the 20 video tracks of the magnetic tape 15 as shown in FIG. 14.

In the above-mentioned first embodiment, the first and second coding circuits 5 and 6, the first and second SYNC block data generation circuits 7 and 8 and the first and second recording signal processing circuits 9 and 10 are configured by two channel circuits. When both the PAL signal and HDTV signal are processed by two channel circuits, the processing time for the PAL signal is half of that of the HDTV signal. In actual use, the PAL signal or NTSC signal may be processed by both the first and second recording signal processing circuits 9 and 10 through the first coding circuit 5 and the first SYNC block data generation circuit 7. In this case, the data represented by Equation (1) is processed by the first recording signal processing circuit 9, and the data represented by Equation (2) is processed by the second recording signal processing circuit 10. The HDTV signal may be processed by the two channel circuits.

[Second embodiment of apparatus for recording and reproducing the digital video signal]

FIG. 21 is a block diagram of the apparatus for recording and reproducing the digital video signal in the second embodiment. In the second embodiment, the data rate conversion circuit 303 is substantially identical with the data rate conversion circuit 3 in FIG. 1. The blocking circuit 304 is illustrated in detail in FIG. 22.

A first coding circuit 305, a second coding circuit 306 and a third coding circuit 307 are configured by the circuit shown in FIG. 4. A first SYNC block data generation circuit 308, a second SYNC block data generation circuit 309 and a third SYNC block data generation circuit 310 are configurated by the circuit shown in FIG. 5. A 3CH/2CH conversion circuit 311 is illustrated in detail in FIG. 23. The first recording signal processing circuit 9, the second recording signal processing circuit 10, the recording amplifiers 11 and 12 and the heads 13a, 13b, 14a and 14b are identical to with the elements having the same reference numerals in FIG. 1.

The first video signal of the PAL signal is input to a terminal 301, and the second video signal of the HDTV signal(1250/50 system) is input to a terminal 302 of the data rate conversion circuit 303.

In the data rate conversion circuit 303, the input video signal is converted into a digital signal and the data rate thereof is also converted. Consequently, the PAL signal is converted into the known 4:2:0 format and the HDTV signal is converted into the known 12:4:0 format.

[Recording operation of PAL signal in the second embodiment]

Figure 22:
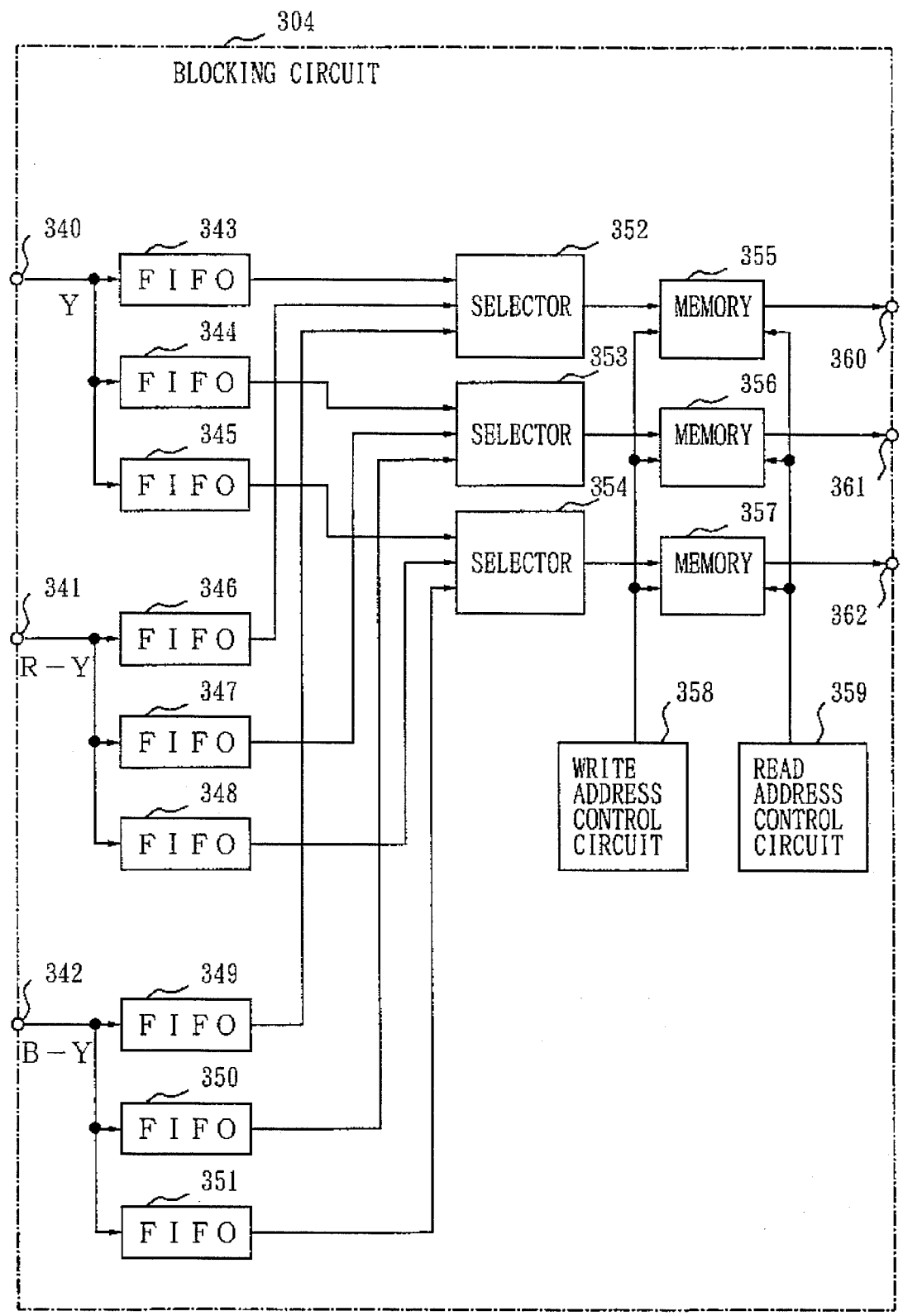
FIG. 22 is a block diagram of a blocking circuit in the apparatus for recording and reproducing the digital video signal of the second embodiment.

In the blocking circuit 304 as shown in FIG. 22, the Y signal is applied to the memory 355 through an input terminal 340, a FIFO 343 and a selector 352. Moreover, the (R-Y) signal is applied to the memory 355 through a terminal 341, a FIFO 346 and the selector 352, and the (B-Y) signal is applied to the memory 355 through a terminal 342, a FIFO 349 and the selector 352. The data of 16 pixels of the Y signal and data of 8 pixels of the (R-Y) signal or the (B-Y) signal are written in the memory 355 as a mini-block, by a control signal from a right address control circuit 358. Subsequently, the data of the macro block are read out of the memory 355 in the orders of the data represented by the Equations (1) and (2), and output to a terminal 360.

The data of the macro blocks are input to the first coding circuit 305 and are coded. The coded data are applied to the first SYNC block data generation circuit 308, thereby the SYNC block data is generated in a manner similar to the first embodiment.

Figure 23:
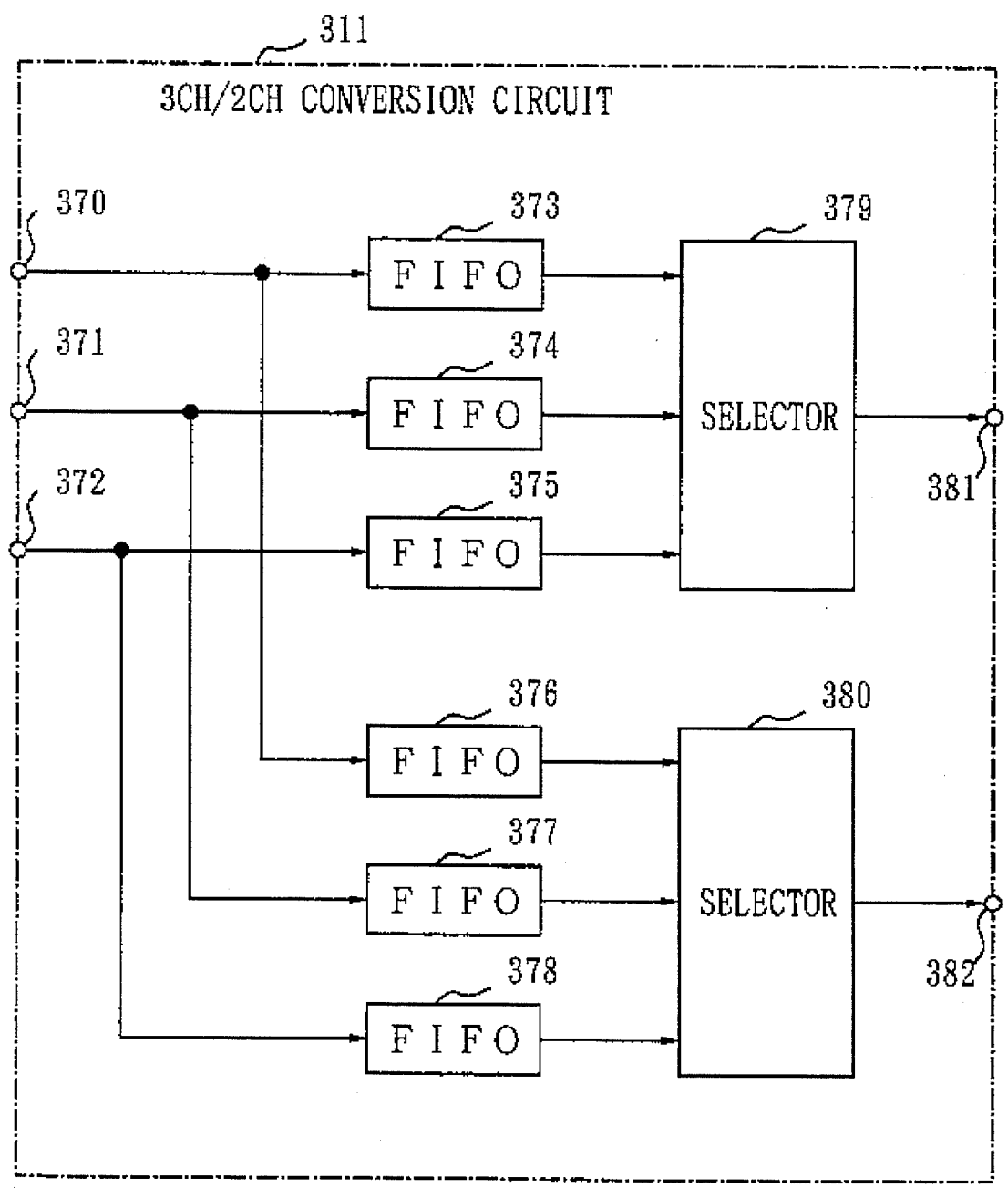
FIG. 23 is a block diagram of a 3CH/2CH conversion circuit in the apparatus for recording and reproducing the digital video signal of the second embodiment.

The SYNC block data is input to a 3CH/2CH conversion circuit 311 as shown in detail in FIG. 23. In the 3CH/2CH conversion circuit in FIG. 23, the data inputted from terminal 370 is distributed to a FIFO 373 or a FIFO 376 in units of SYNC block data. The SYNC block data output from a terminal 381 of the 3CH/2CH conversion circuit 311 is a SYNC block data including main components after data compression of the macro blocks represented by Equation (1). The SYNC block data output from a terminal 382 of the 3CH/2CH conversion circuit 311 through the FIFO 376 and a selector 380 includes main components after data compression of the macro blocks represented by the Equation (2). Consequently, the SYNC block data input from the input terminal 370 is distributed to two output terminals 381 and 382. These SYNC block data are applied to the respective first recording signal processing circuit 9 and the second recording signal processing circuit 10, and are recorded in the magnetic tape 15 in a manner similar to the first embodiment. The order of the SYNC block data to be recorded in a video track is represented by the Equation (3).

[Recording operation of HDTV signal (1250/50 system) of the second embodiment]

The recording operation of the HDTV signal (1250/50 system) is described hereafter. Referring to FIG. 21, the HDTV signal input to the terminal 302 is converted to a digital signal in the data rate conversion circuit 303, and the data rate is also converted. The digital data is input to the blocking circuit 304. In the blocking circuit 304 shown in FIG. 22, the data of Y signal of one horizontal line is divided into sections each having 24 pixels, and the data of the sections are input to the FIFOs 343, 344 and 345 in turn through the terminal 340.

Moreover, the (R-Y) signal of one horizontal line is divided into sections each having 8 pixels, and the data of sections are inputted to the FIFOs 346, 347 and 348 in turn through a terminal 341. And the (B-Y) signal of one horizontal line is also divided into sections each having 8 pixels and the data of sections are inputted to FIFOs 349, 350 and 351 in turn through a terminal 342. Subsequently, the data are read out from the FIFOs 343, 346 and 349, and are applied to the memory 355 through the selector 352. The data read out from the FIFOs 344, 347 and 350 are inputted to the memory 356 through the selector 353.

Moreover, the data read out from the FIFOs 345, 348 and 351 are input to the memory 357 through the selector 354. The data input to the memory 355 is designated by "channel 1", the data input to the memory 356 is designated by "channel 2" and the data input to the memory 357 is designated by "channel 3". Consequently, the video image of one frame is divided into rectangular areas which are sectioned in the horizontal direction every 24 pixels. The rectangular area is designated by channel 1, channel 2, and channel 3 in the order of from left to right in the video image. The number of pixel of one section in the horizontal direction is identical with the number of pixel of one macro block.

The data of three channels are simultaneously written in the three memories 355, 346 and 357 by the control signal of the write address control circuit 358. Namely, the data of pixels of three macro blocks in the horizontal direction are simultaneously written in the memories. Subsequently, data of successive three macro blocks in the horizontal direction are read out from the memories 355, 346 and 357 by the control signal of the read address control circuit 359.

The data of the macro blocks of the channels 1, 2 and 3 are applied to the first coding circuit 305, the second coding circuit 306 and the third coding circuit 307 through the terminals 306, 361 and 362, respectively. The configuration of the first coding circuit 305, the second coding circuit 306 and the third coding circuit 307 are identical to the coding circuit 5 shown in FIG. 5 and perform the same operation as the coding circuit 5. The output data of the first coding circuit 305 is applied to the first SYNC block data generation circuit 308, the output data of the second circuit 306 is applied to the second SYNC block data generation circuit 309 and the output data of the third coding circuit 307 is applied to the third SYNC block data generation circuit 310. The circuit configurations of the first SYNC block data generation circuit 308, the second SYNC block data generation circuit 309 and the third SYNC block data generation circuit 310 are identical with the circuit configuration of the SYNC block data generation circuit 7 shown in FIG. 5.

The SYNC block data generated by the first, second and third SYNC block data generation circuits 308, 309 and 310 are applied to the 3CH/2CH conversion circuit 311. The input data of three channels are converted to two channels by the 3CH/2CH conversion circuit 311, and are output to the terminal 381 as the SYNC block data including main components after data-compression of one macro block as shown by Equation (4). Moreover, SYNC block data as shown by Equation (5) is output to the terminal 382.

These SYNC block data are recorded on the magnetic tape 15 which is moved at about twice speed with respect to the tape moving speed in the PAL signal through the respective recording signal processing circuits 9 and 10 and recording amplifiers 11 and 12. The order of data which are recording on the video tracks are represented by Equation (6).

[Reproducing operation of PAL signal]

In the reproducing operation of the PAL signal, in a manner similar to the first embodiment, reproduced data by the reproducing heads 16A and 16B are applied to the 2CH/3CH conversion circuit 325 through the reproducing amplifier 18 and the first reproducing signal processing circuit 20 and the reproduced data by the reproducing heads 17A and 17B are applied to the 2CH/3CH conversion circuit 325 through the first reproducing signal processing circuit 19 and the second recording signal processing circuit 21. In the 2CH/3CH conversion circuit, the data of the PAL signal is converted to the data of one channel, and is applied to the first coded data restoration circuit 326. The PAL signal is output to the terminal 334 through the first decoding circuit 329, deblocking circuit 332 and the signal rate inversion circuit 333.

[Reproducing operation of the HDTV signal in the second embodiment]

In the reproducing operation of the HDTV signal, reproduced data by the reproducing heads 16A and 16B are applied to the 2CH/3CH conversion circuit 325 through the reproducing amplifier 18 and the first reproducing signal processing circuit 20, and the reproduced data by the reproducing heads 17A and 17B are applied to the 2CH/3CH conversion circuit 325 through the reproducing amplifier 19 and the second reproducing signal processing circuit 21. The data of the HDTV signal are converted to three channel data by the 2CH/3CH conversion circuit 325. The data of three channels are applied to the deblocking circuit 332 through the respective coded data restoration circuits 326, 327 and 328 and decoding circuits 329, 330 and 331. Consequently, the HDTV signal is output to the terminal 335 through the deblocking circuit 332 and the signal rate inversion circuit 333.

As mentioned above, in the apparatus for recording and reproducing the digital video signal of the second embodiment, the PAL signal of 625/50 system and the HDTV signal of 1250/50 system are recorded or reproduced.

Moreover, in the apparatus for recording and reproducing the digital video signal of the second embodiment, the NTSC signal (525/60 system) and the HDTV signal (1050/60 system) or the NTSC signal and the HDTV signal (1125/60 system) may be recorded and reproduced in a similar manner mentioned above.

Figure 24:
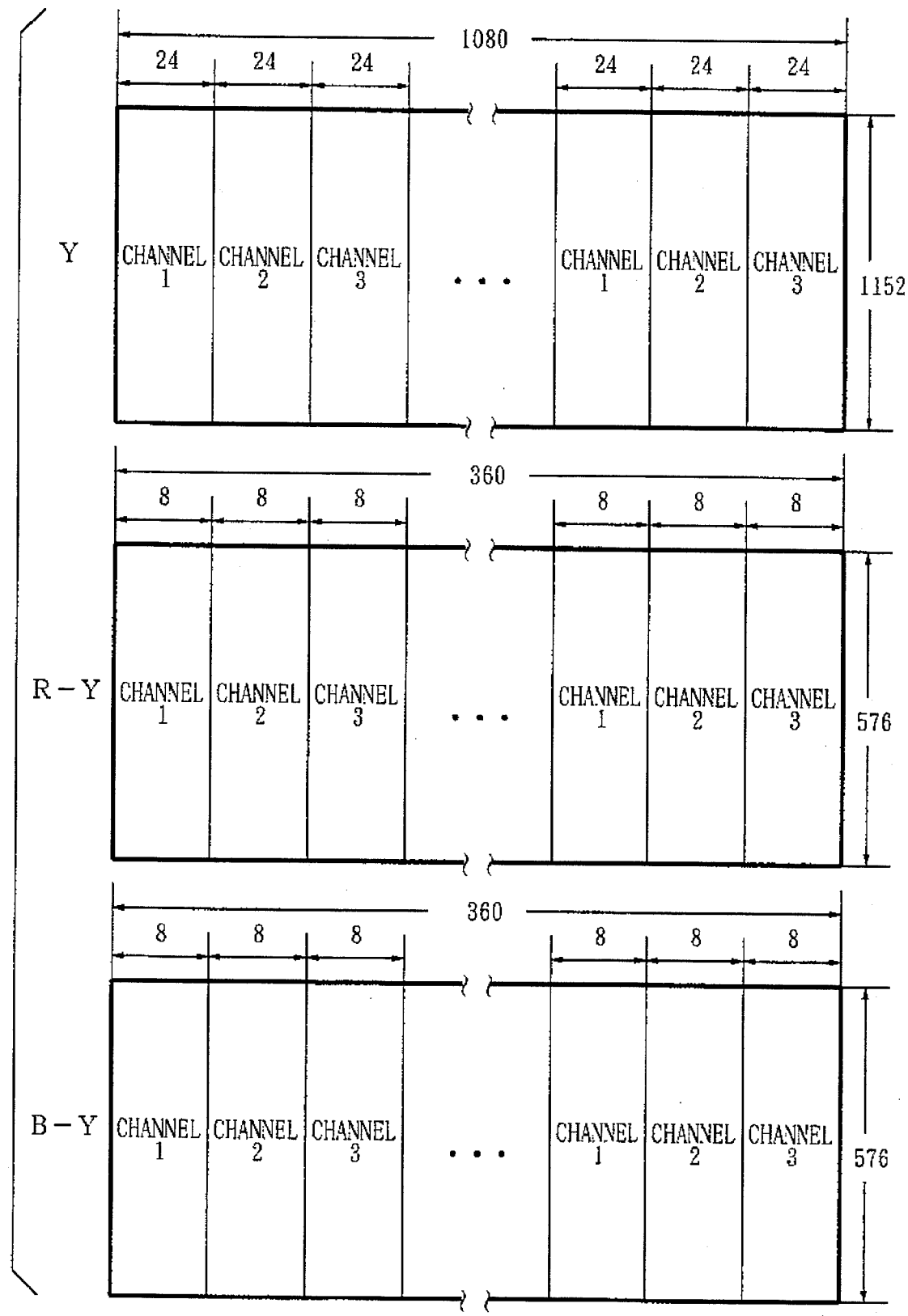
FIG. 24 is diagrams representing the division of video image of one frame in the apparatus for recording and reproducing the digital video signal of the second embodiment.

In FIG. 20B, the super blocks of the HDTV signal of 1125/60 system comprise the macro blocks of a multiple of 3 in the horizontal direction. Therefore, the HDTV signal of 1125/60 system is easily processed by the blocking circuit 304 having three channels as shown in FIG. 22. The unit for processing the macro block data at the end part of the video image is equalized to the unit for processing the macro block data in the central portion of the video image. Therefore, rearrangement of the data in the blocking circuit 304 is easily performed. Moreover, as shown in FIG. 23, 3CH/2CH conversion circuit 311 may be configured by a relatively simplified circuit. Data of the HDTV signal of 1125/60 system may be processed by rearrangement of data as shown in FIG. 20A, FIG. 20B, FIG. 20C and FIG. 20D, and three channel processing operation may be performed by dividing the video image in a manner similar to FIG. 24.

Incidentally, in the case that only the HDTV signal is recorded in the apparatus for recording and reproducing the digital video signal in the above-mentioned embodiments, only three ADCs 31, 32 and 33 are required in the data rate conversion circuit 3.

What is claimed is:

1. An apparatus for recording and reproducing a digital video signal comprising:

input means for inputting digital data of a first video signal of a first video system and a second video signal of a second video system, wherein data of one frame of said first video signal is divided into a first predetermined number of image blocks, data of one frame of said second video signal is divided into a second predetermined number of image blocks, data of a first color difference signal of one image block of said first video signal is comprised of a third predetermined number of pixels, data of a second color difference signal of one image block of said second video signal is comprised of a fourth predetermined number of pixels, a ratio of said second predetermined number to said first predetermined number is designated by a first natural number n, and a ratio of said fourth predetermined number to said third predetermined number is designated by a second natural number m;

data rate conversion means for converting said first color difference signal of said first video signal and said second color difference signal of said second video signal so that a ratio of a first data rate of said first color difference signal to a second data rate of said second color difference signal is 1:n×m;

blocking means for forming said first video signal and said second video signal into image blocks so that a ratio of said number of image blocks of one frame of said first video signal to said number of image blocks of one frame of said second video signal is 1:n, n being said first natural number, and so that a ratio of said number of pixels of said data of said first color difference signal of one image block of said first video signal to said number of pixels of said data of said second color difference signal of one image block of said second video signal is 1:m, m being said second natural number;

coding means for data-compressing said data of said first video signal and said data of said second video signal so that a ratio of a data rate of said first video signal to a data rate of said second video signal is 1:n;

synchronizing block data generation means for generating synchronizing block data by storing compressed data of one image block of one of said first video signal and said second video signal output from said coding means in one synchronizing block; and recording means for recording data from said synchronizing block in a recording medium.

2. An apparatus for recording and reproducing a digital video signal comprising:

input means for inputting digital data of a first video signal of a first video system and a second video signal of a second video system, wherein data of one frame of said first video signal is divided into a first predetermined number of image blocks, data of one frame of said second video signal is divided into a second predetermined number of image blocks, data of a first color difference signal of one image block of said first video signal is comprised of a third predetermined number of pixels, data of a second color difference signal of one image block of said second video signal is comprised of a fourth predetermined number of pixels, a ratio of said second predetermined number to said first predetermined number is designated by a first natural number n, and a ratio of fourth predetermined number of said third predetermined number is designated by natural number m;

data rate conversion means for converting said first color difference signal of said first video signal and said second color difference signal of said second video signal so that a ratio of a first data rate of said first color difference signal to a second data rate of said second color difference signal is 1:n×m, blocking means for forming said first video signal and said second video signal into image blocks so that a ratio of said number of image blocks of one frame of said first video signal to said number of image blocks of one frame of said second video signal is 1:n, n being said first natural number, and so that a ratio of said number of pixels of said data of said first color difference signal of one image block of said first video signal to said number of pixels of said data of said second color difference signal of one image block of said second video signal is 1:m, m being said second natural number;

coding means for data-compressing said data of said first video signal and said data of said second video signal so that a ratio of a first data rate of said first video signal to a second data rate of said second video signal is 1:n;

synchronizing block data generation means for generating synchronizing block data by storing compressed data of one image block of one of said first video signal and said second video signal output from said coding means in one synchronizing block; and recording means for recording data from said synchronizing block data of one frame of said first video signal in a fifth predetermined number t of tracks of a magnetic tape, and recording data from said synchronizing block of one frame of said second video signal in a number of tracks corresponding to a product of said fifth predetermined number t and said first natural number n.

3. An apparatus for recording and reproducing a digital video signal in accordance with claim 1 or 2, wherein said synchronizing block data generation means stores data corresponding to a low frequency component of an original video signal after data-compression of one image block into one synchronizing block.

4. An apparatus for recording and producing a digital video signal in accordance with claim 2, wherein said first video signal has 525 scanning lines per one frame and said first data rate is 60 fields per second, said second video signal has 1125 scanning lines per one frame and said second data rate is 60 fields per second, said first natural number n is 2, said second natural number m is 1 and said fifth predetermined number is 10, said first video signal is in a 4:1:1 format, and said second video signal is in a 12:4:0 format, a number of pixels of said image block of said first video signal includes 256 pixels of a luminance signal arranged so that there are 32 horizontal pixels×4 vertical lines×2 fields, 64 pixels of a color difference signal R-Y arranged so that there are 8 horizontal pixels×4 vertical lines×2 fields, and 64 pixels of a color difference signal B-Y arranged so that there are 8 horizontal pixels×4 vertical pixels×2 fields, and a number of pixels of said image block of said second video signal includes 384 pixels of a luminance signal arranged so that there are 24 horizontal pixels×8 vertical lines×2 fields, 64 pixels of a color difference signal R-Y arranged so that there are 8 horizontal pixels×4 vertical lines×2 fields, and 64 pixels of a color difference signal B-Y arranged so that there are 8 horizontal pixels×4 vertical lines×2 fields.

5. An apparatus for recording and reproducing a digital video signal in accordance with claim 2, wherein said first video signal has 625 scanning lines per one frame and said first data rate is 50 fields per second, said second video signal has 1250 scanning lines per one frame and said data rate is 50 fields per second, said first natural number is 2, said second natural number m is 1, and said fifth predetermined number t is 12, said first video signal is converted to a 4:2:0 format, said second video signal is converted to a 12:4:0 format, a number of pixels of said image block of said first video signal includes 256 pixels of a luminance signal arranged so that there are 16 horizontal pixels×8 vertical lines×2 fields, 64 pixels of a color difference signal R-Y arranged so that there are 8 horizontal pixels×4 vertical lines×2 fields, and 64 pixels of a color difference signal B-Y arranged so that there are 8 horizontal pixels×4 vertical lines×2 fields, and a number of pixels of said image block of said second video signal includes 384 pixels of a luminance signal arranged so that there are 24 horizontal pixels×8 vertical lines×2 fields, 64 pixels of a color difference signal R-Y arranged so that there are 8 horizontal pixels×4 vertical lines×2 fields, and 64 pixels of a color difference signal B-Y arranged so that there are 8 horizontal pixels×4 vertical lines×2 fields.

6. An apparatus for recording and reproducing a digital video signal comprising:

blocking means for dividing data of one frame of a video image of a video system into image blocks, wherein a central portion of an end area of said video image is divided into a first predetermined number of image blocks of a first type in a vertical direction, an upper area and a lower area of said end area of said video image are divided into a second predetermined number of image blocks of a second type which is different from said first type in block size, and a remaining area of said video image is divided into a third predetermined number image blocks, said blocking means including:

means for transforming said image blocks of said second type into image blocks of a third type which are different from said image blocks of said second type in that their relative positions in said video image are different, and wherein data of one image block of said first type and data of one image block of said third type are arranged so that they can be provided in one video track of a recording medium;

coding means for compressing data representing said video image in units of image blocks;

synchronizing block data generation means for generating synchronizing block data by storing compressed data of one image block output by said coding means in one synchronizing block; and recording means for recording said synchronizing block data on a recording medium.

7. An apparatus for recording and reproducing a digital video signal comprising:

blocking means for dividing data of one frame of a video image of a video system into image blocks, wherein a central portion of an end area of said video image is divided into a first predetermined number of image blocks of a first type in a vertical direction, an upper area and a lower area of said end area of said video image are divided into a second predetermined number of image blocks of a second type, and a remaining area of said video image is divided into a third predetermined number image blocks, said blocking means including:

means for transforming said image blocks of said second type into image blocks of a third type, and wherein data of one image block of said first type and data of one image block of said third type are arranged so that they can be provided in one video track of a recording medium;

coding means for compressing data representing said video image in units of image blocks;

synchronizing block data generation means for generating synchronizing block data by storing compressed data of one image block output by said coding means in one synchronizing block; and recording means for recording said synchronizing block data on a recording medium, wherein the video signal of said video system is 1125 scanning lines per one frame and has a data rate of 60 fields per one second, said first predetermined number is 20, said image block comprises data of a luminance signal arranged so that there are 24 horizontal pixels×8 vertical lines×2 fields, data of a color difference signal R-Y are arranged so that there are 8 horizontal pixels×4 vertical lines×2 fields, and data of a color difference signal B-Y are arranged so that there are 8 horizontal pixels×4 vertical lines×2 fields.

8. An apparatus for recording and reproducing a digital video signal comprising:

input means for inputting digital data corresponding to a first video signal in a first video system and a second video signal in a second video system;

data rate conversion means for modifying a first data rate of a color difference signal in said first video signal and for modifying a second data rate of a color difference signal in said second video signal;

blocking means for dividing data of one frame of one of said first and said second video signals into predetermined image blocks and for forming mini-blocks from a partial data of said image blocks;

coding means for compressing said data corresponding to said first video signal and said second video signal;

synchronizing block data generation means for generating synchronizing block data by storing compressed data of one image block of one of said first video signal and said second video signal output by said coding means; and recording means for recording said synchronizing block data in a recording medium, wherein said image block comprises data of a luminance signal of 24 horizontal pixels×8 vertical lines×2 fields, data of a color difference signal R-Y of 8 horizontal pixels×4 vertical lines×2 fields, and data of a color difference signal B-Y of 8 horizontal pixels×4 vertical lines×2 fields, and said mini-blocks comprise a first mini-block comprising data of said luminance signal of 24 horizontal pixels in one horizontal line and a second mini-block comprising data of said color difference signal R-Y of 8 horizontal pixels and said data of said color difference signal B-Y of 8 horizontal pixels in two horizontal lines.

9. An apparatus for recording and reproducing a digital video signal in accordance with claim 1, wherein values of m and n are 1 and 2, respectively.

10. An apparatus for recording and reproducing a digital video signal in accordance with claim 2, wherein values of m and n are 1 and 2, respectively.

* * * * *